United States Patent
Kim et al.

(10) Patent No.: US 10,492,222 B2
(45) Date of Patent: Nov. 26, 2019

(54) METHOD AND DEVICE FOR PERFORMING LBT PROCESS ON MULTIPLE CARRIERS IN WIRELESS ACCESS SYSTEM SUPPORTING UNLICENSED BAND

(71) Applicant: LG ELECTRONICS INC., Seoul (KR)

(72) Inventors: Seonwook Kim, Seoul (KR); Joonkui Ahn, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/758,306

(22) PCT Filed: Sep. 7, 2016

(86) PCT No.: PCT/KR2016/010036
§ 371 (c)(1),
(2) Date: Mar. 7, 2018

(87) PCT Pub. No.: WO2017/047973
PCT Pub. Date: Mar. 23, 2017

(65) Prior Publication Data
US 2018/0255578 A1    Sep. 6, 2018

Related U.S. Application Data

(60) Provisional application No. 62/220,231, filed on Sep. 17, 2015, provisional application No. 62/370,248, filed on Aug. 3, 2016.

(51) Int. Cl.
*H04L 12/801* (2013.01)
*H04L 12/24* (2006.01)
(Continued)

(52) U.S. Cl.
CPC ........ *H04W 74/0808* (2013.01); *H04L 5/001* (2013.01); *H04W 16/14* (2013.01);
(Continued)

(58) Field of Classification Search
CPC ............... H04W 74/085; H04W 16/14; H04W 72/1268; H04L 5/001
See application file for complete search history.

(56) References Cited

U.S. PATENT DOCUMENTS

| | | |
|---|---|---|
| 2015/0057011 A1 | 2/2015 | Di Girolamo et al. |
| 2015/0085797 A1 | 3/2015 | Ji et al. |

(Continued)

OTHER PUBLICATIONS

R1-154047, XP051001438: 3GPP TSG RAN WG1 Meeting #82, Beijing, China, Aug. 24-28, 2015, ZTE, "Discussion on the UL LBT for LAA," pp. 1-8.
(Continued)

*Primary Examiner* — Brian S Roberts
*Assistant Examiner* — Abusayeed M Haque
(74) *Attorney, Agent, or Firm* — Dentons US LLP

(57) ABSTRACT

The present invention relates to a wireless access system supporting an unlicensed band. According to this disclosure, a method by which a terminal performs LBT in a wireless access system supporting an unlicensed band and multiple carriers can comprise receiving, from a base station, each of uplink grants for scheduling uplink channels on two or more component carriers (CCs); randomly selecting a first CC on which a first LBT is to be performed from among the two or more CCs; performing the first LBT on the selected first CC; and performing a second LBT on the remaining CCs among the two or more CCs, wherein the first LBT can be a random back-off-based LBT for performing a random back-off by a random back-off counter value, and the second LBT can be
(Continued)

a channel sensing-based LBT for sensing a channel during a predetermined time interval before uplink transmission.

14 Claims, 26 Drawing Sheets

(51) Int. Cl.

| | |
|---|---|
| *H04L 5/14* | (2006.01) |
| *H04W 84/12* | (2009.01) |
| *H04J 13/18* | (2011.01) |
| *H04W 74/08* | (2009.01) |
| *H04L 5/00* | (2006.01) |
| *H04W 16/14* | (2009.01) |
| *H04W 72/12* | (2009.01) |
| *H04W 72/14* | (2009.01) |

(52) U.S. Cl.
CPC ... *H04W 72/1268* (2013.01); *H04W 74/0833* (2013.01); *H04W 72/14* (2013.01)

(56) References Cited

U.S. PATENT DOCUMENTS

| | | | | |
|---|---|---|---|---|
| 2015/0250002 | A1 | 9/2015 | Sun et al. | |
| 2016/0021661 | A1* | 1/2016 | Yerramalli | H04W 16/14 370/329 |
| 2016/0037352 | A1* | 2/2016 | Wei | H04W 72/1268 455/454 |
| 2016/0278088 | A1* | 9/2016 | Cheng | H04L 47/27 |
| 2017/0318607 | A1* | 11/2017 | Tiirola | H04W 72/0446 |
| 2018/0199376 | A1 | 7/2018 | Kim et al. | |

OTHER PUBLICATIONS

Institute for Information Industry (III), "Solutions to DL LAA Hidden Node and Channel Reuse", 3GPP TSG-RAN WG1 Meeting #80, Feb. 9-13, 2015, R1-150420.
Huawei, HiSilicon, "Discussion on the application of LBT options in eLAA", 3GPP TSG RAN WG1 85 Meeting, May 23-27, 2016, R1-164071.
Samsung, "Discussion on UL LBT alignment", 3GPP TSG RAN WG1 Meeting #85, May 23-27, 2016, R1-164751.
Huawei, HiSilicon, Qualcomm, Samsung, ZTE, Intel, ITL, [Nokia, ALU, Intel, Ericsson], "WF on transmission and triggering SRS without PUSCH", 3GPP TSG RAN WG1 #85, May 23-27, 2016, R1-165573.
Wilus Inc., "UL Multi-carrier Transmission for eLAA", 3GPP TSG RAN WG1 Meeting #86, Aug. 22-26, 2016, R1-167788.
Cisco Systems: "Downlink Channel Access for LAA", R1-153843, 3GPP TSG RAN WG1 Meeting #82, Beijing, China, Aug. 24-28, 2015.
Ericsson: "On carrier selection for LAA", R1-150585, 3GPP TSG RAN WG1 Meeting #80, Athens, Greece, Feb. 9-13, 2015.
International Search Report from PCT/KR2016/010036, dated Dec. 5, 2016.
Written Opinion of the ISA from PCT/KR2016/010036, dated Dec. 5, 2016.
LG Electronics, "LBT schemes in LAA UL", 3GPP TSG RAN WGI meeting #84, Feb. 15-19, 2016, R1-160630.
Kyocera, "Channel Access Scheme for UE multiplexing", 3GPP TSG RAN WG1 Meeting #84bis, Apr. 11-15, 2016, R1-162753.
Huawei, HiSilicon, "PHY signaling design for eLAA", 3GPP TSG RAN WG1 Meeting #85, May 23-27, 2016, R1-164829.
Huawei, HiSilicon, "LBT Operation for LAA Uplink", 3GPP TSG-RAN WG2 Meeting #89bis, Apr. 20-24, 2015, R2-151175.
Huawei, HiSilicon, "QoS Control in LAA UL Operation", 3GPP TSG-RAN WG2 Meeting #89bis, Apr. 20-24, 2015, R2-151176.

\* cited by examiner

PUCCH format 1a and 1b structure (normal CP case)

PUCCH format 1a and 1b structure (extended CP case)

PUCCH format 2, 2a, and 2b structure (normal CP case)

PUCCH format 2, 2a, and 2b structure (extended CP case)

FIG. 10 resource allocation: 18 ACK/NACK channels in normal CP

| cell-specific cyclic shift offset | | RS orthogonal cover shift | | | ACK/NACK orthogonal cover shift | | |
|---|---|---|---|---|---|---|---|
| $\delta_{offset}^{PUCCH} = 1$ | $\delta_{offset}^{PUCCH} = 0$ | $n_{OC} = 0$ | $n_{OC} = 1$ | $n_{OC} = 2$ | $n_{OC} = 0$ | $n_{OC} = 1$ | $n_{OC} = 2$ |
| $n_{CS} = 1$ | $n_{CS} = 0$ | $n' = 0$ | 6 | 12 | $n' = 0$ | 6 | 12 |
| 2 | 1 | 1 | 7 | 13 | 1 | 7 | 13 |
| 3 | 2 | 2 | 8 | 14 | 2 | 8 | 14 |
| 4 | 3 | 3 | 9 | 15 | 3 | 9 | 15 |
| 5 | 4 | 4 | 10 | 16 | 4 | 10 | 16 |
| 6 | 5 | 5 | 11 | 17 | 5 | 11 | 17 |
| 7 | 6 | | | | | | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{1,2,3\}$ normal CP case
$\{1,2,3\}$ extended CP case
cell-specific cyclic shift value of CAZAC sequence $\delta_{offset}^{PUCCH} \in \{0,1,...,\Delta_{shift}^{PUCCH} - 1\}$ specific cyclic shift offset $n_{OC}$ orthogonal sequence index for ACK/NACK
$\bar{n}_{OC}$ orthogonal sequence index for RS
$n_{CS}$ cyclic shift value of CAZAC sequence
$n'$ ACK/NACK resource index used for channelizing in RB FIG. 19
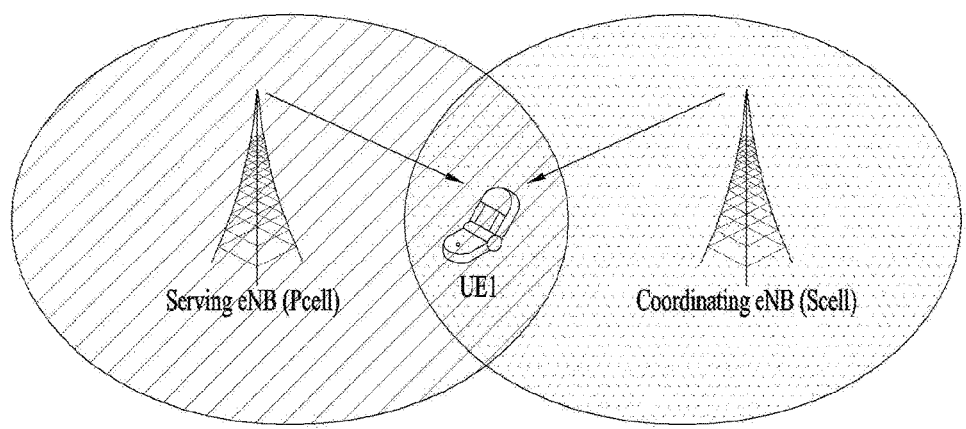
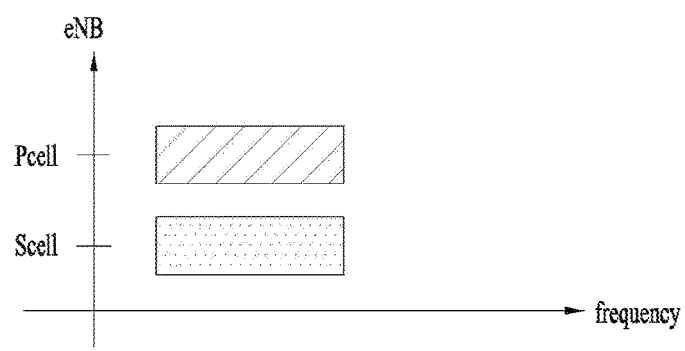

FIG. 25
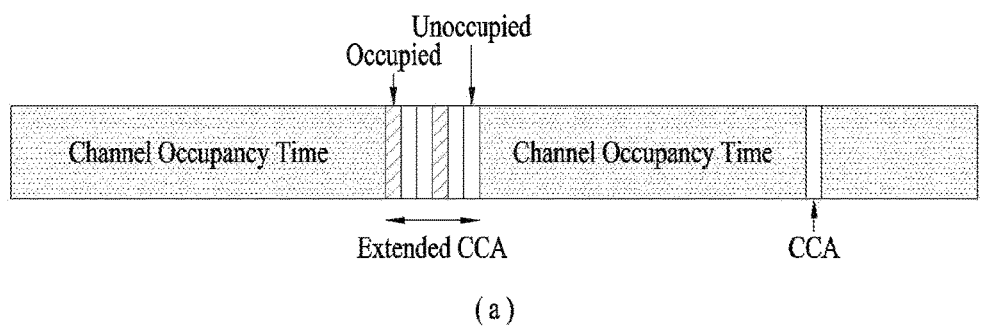
(a)
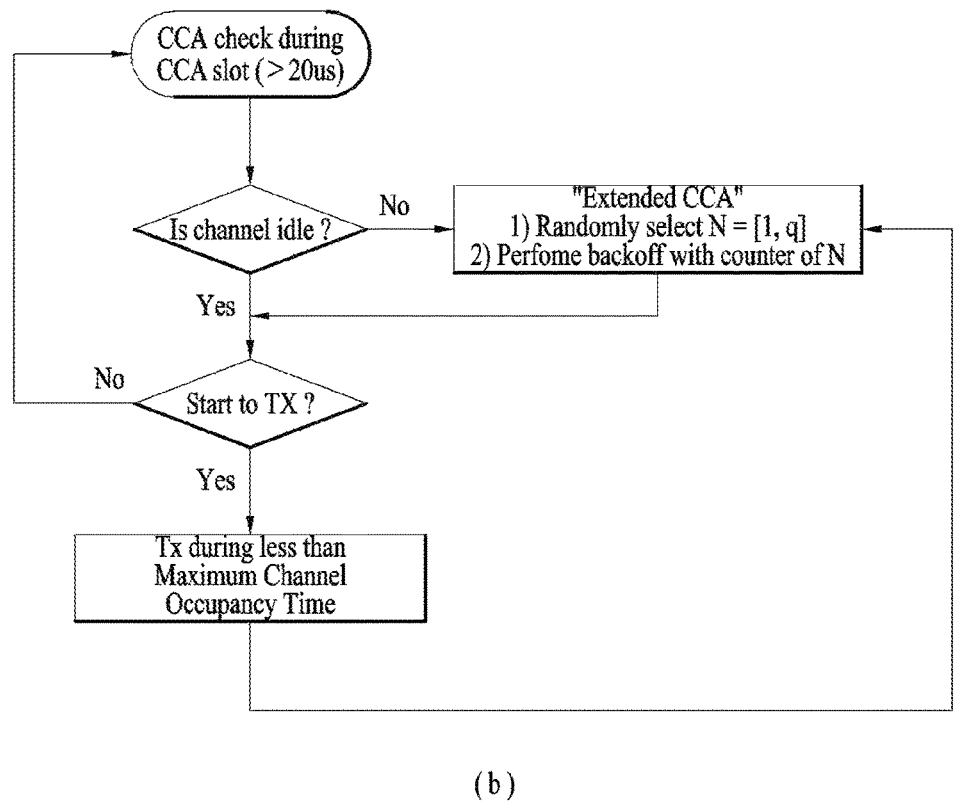
(b)

METHOD AND DEVICE FOR PERFORMING LBT PROCESS ON MULTIPLE CARRIERS IN WIRELESS ACCESS SYSTEM SUPPORTING UNLICENSED BAND

This application is a 35 USC § 371 National Stage entry of International Application No. PCT/KR2016/010036 filed on Sep. 7, 2016, and claims priority to U.S. Provisional Application Nos. 62/220,231 filed on Sep. 17, 2015 and 62/370,248 filed on Aug. 3, 2016, all of which are hereby incorporated by reference in their entireties as if fully set forth herein.

TECHNICAL FIELD

The present disclosure relates to a wireless access system supporting an unlicensed band, and more particularly, to methods for performing uplink listen and before talk (LBT) in multiple carriers, methods for sharing a carrier between a base station (BS) and a user equipment (UE), and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method for transmitting and receiving data efficiently in a wireless access system supporting an unlicensed band.

Another aspect of the present disclosure is to provide methods for performing listen before talk (LBT) to transmit uplink data in an unlicensed band.

Another aspect of the present disclosure is to provide methods for efficiently performing LBT in a multi-carrier/carrier aggregation environment.

Another aspect of the present disclosure is to provide methods for, when a channel time period occupied through downlink (DL) LBT by a base station (BS) still remains after a DL transmission, sharing the remaining channel time period between the BS and a user equipment (UE).

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting an unlicensed band, and more particularly, to methods for performing uplink listen and before talk (LBT) in multiple carriers, methods for sharing a carrier between a base station (BS) and a user equipment (UE), and apparatuses supporting the same.

In one aspect of the present disclosure, a method for performing LBT by a UE in a wireless access system supporting an unlicensed band and multiple carriers may include receiving, from a BS, an uplink grant for scheduling an uplink channel in each of two or more component carriers (CCs), randomly selecting a first CC to be subjected to first LBT from among the two or more CCs, performing the first LBT in the selected first CC, and performing second LBT in remaining CCs of the two or more CCs. The first LBT may be random backoff-based LBT for performing random backoff as long as a random backoff count, and the second LBT may be carrier sensing-based LBT for sensing a channel for a predetermined time period before a UL transmission.

In one aspect of the present disclosure, a UE for performing LBT in a wireless access system supporting an unlicensed band and multiple carriers may include a receiver, and a processor configured to perform LBT. The processor may be configured to receive, from a BS, an uplink grant for scheduling an uplink channel in each of two or more CCs by controlling the receiver, to randomly select a first CC to be subjected to first LBT from among the two or more CCs, and to perform the first LBT in the selected first CC and second LBT in remaining CCs of the two or more CCs by controlling the receiver. Preferably, the first LBT is random backoff-based LBT for performing random backoff as long as a random backoff count, and the second LBT is carrier sensing-based LBT for sensing a channel for a predetermined time period before a UL transmission.

The UE may transmit a UL signal in a CC determined to be idle by performing the first LBT and the second LBT.

Before the first CC is selected, a carrier group may be configured for the two or more CCs. The carrier group may be configured dynamically by physical layer signaling.

The carrier group may include CCs configured to be subjected to the first LBT.

Or the carrier group may include a CC configured to be subjected to the first LBT and a CC configured to be subjected to the second LBT.

The scheduling grant may include an LBT type parameter indicating the type of LBT performed in a scheduled CC, and an LBT parameter required for performing LBT.

Even though the first LBT is indicated for the remaining CCs, the second LBT may be performed in the remaining CCs.

It is to be understood that both the foregoing general description and the following detailed description of the present disclosure are exemplary and explanatory and are intended to provide further explanation of the disclosure as claimed.

Advantageous Effects

The embodiments of the present disclosure have the following effects.

First, data may be transmitted and received efficiently in a wireless access system supporting an unlicensed band.

Secondly, a listen before talk (LBT) process for transmitting uplink data in an unlicensed band can be performed efficiently.

Thirdly, LBT can also be performed efficiently in a multi-carrier/carrier aggregation environment.

Fourthly, when a channel time period occupied through downlink (DL) LBT by a base station (BS) still remains after a DL transmission, the BS shares the remaining channel time period with a user equipment (UE), thereby increasing the throughput of the BS and/or the UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a view illustrating acknowledgment/negative acknowledgment (ACK/NACK) channelization for PUCCH formats 1a an 1b;

FIG. 19 is a conceptual view illustrating a coordinated multi-point (CoMP) system operating in a CA environment;

FIG. 25 is a view illustrating an exemplary load Based equipment (LBE) operation as one of the LBT operations;

BEST MODE FOR CARRYING OUT THE INVENTION

Figure 1:
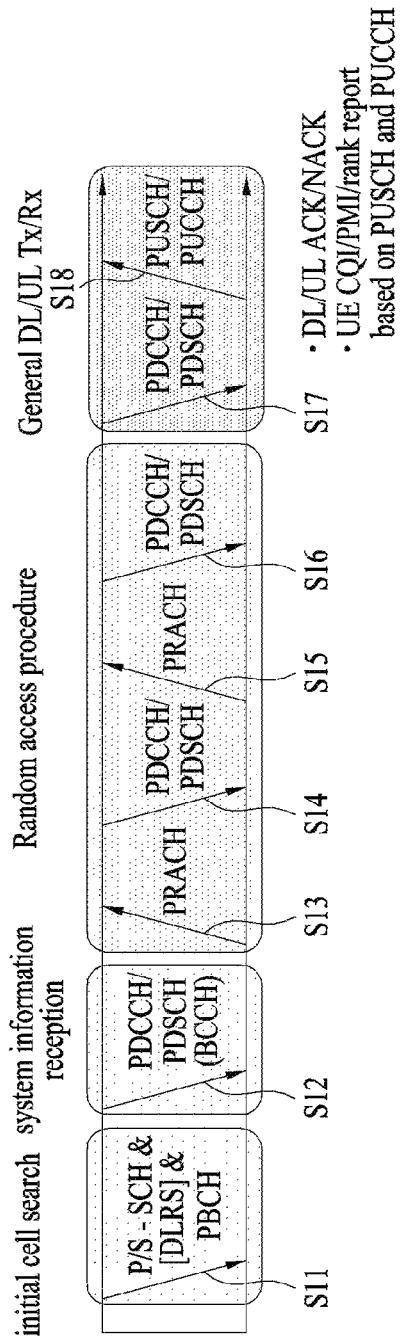
FIG. 1 is a view illustrating physical channels and a signal transmission method using the physical channels.

Embodiments of the present disclosure as described below in detail relate to a wireless access system supporting an unlicensed band, and provide methods for performing uplink (UL) listen before talk (LBT) in multiple carriers, methods for sharing a carrier between a base station (BS) and a user equipment (UE), and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical feature and scope of the present disclosure.

For example, the term transmission opportunity period (TxOP) is interchangeable with transmission period, Transmission (Tx) burst, or reserved resource period (RRP). Further, an LBT operation may be performed for the same purpose as that of carrier sensing for determining whether a channel is in an idle state, clear channel assessment (CCA), and a channel access procedure (CAP).

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a Primary Synchronization Channel (P-SCH) and a Secondary Synchronization Channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
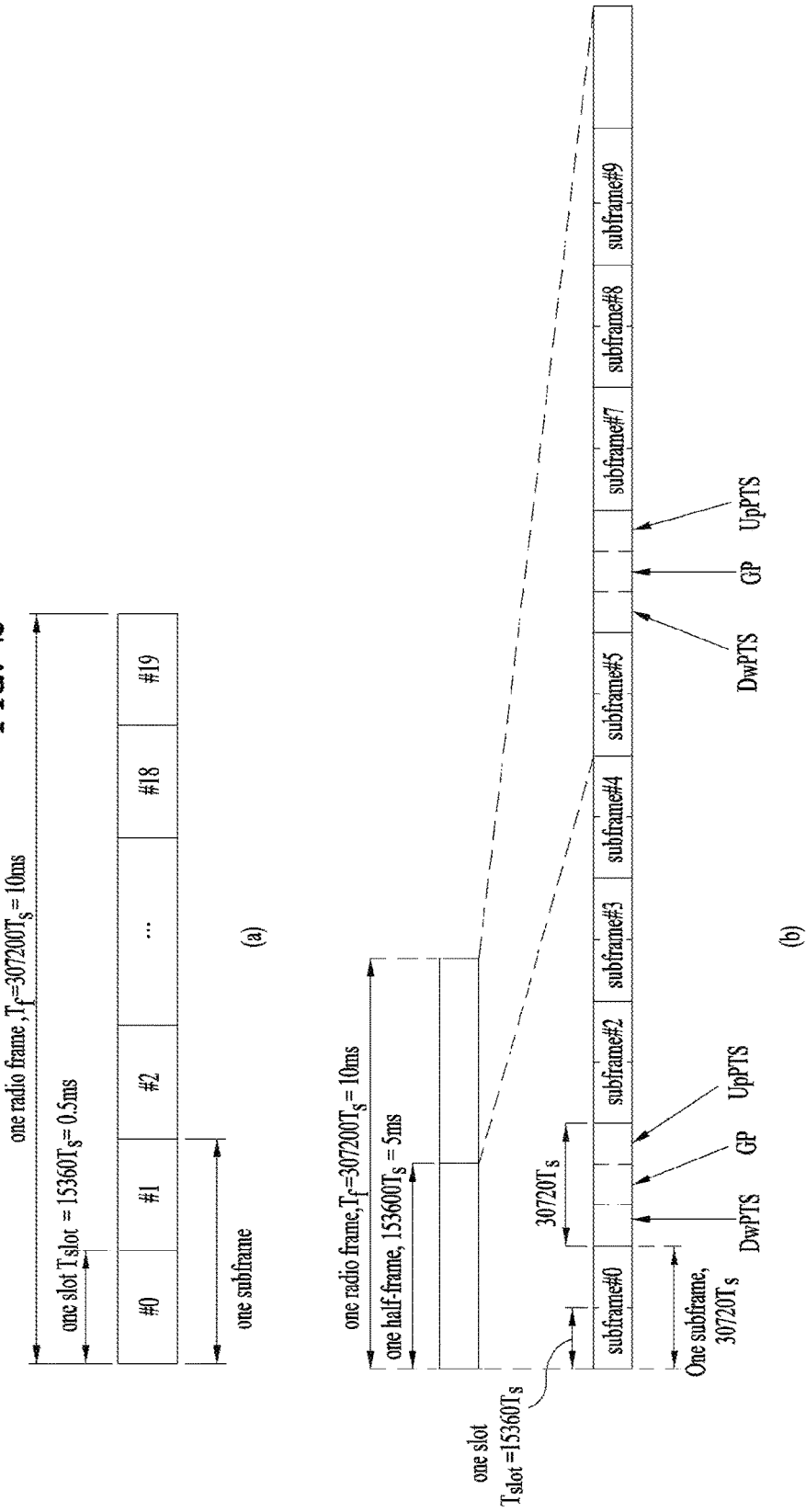
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An $i^{th}$ subframe includes 2ith and (2i+1)$^{th}$ slots. That is, a radio frame includes 10 subframes. A time required for transmitting one subframe is defined as a transmission time interval (TTI). Ts is a sampling time given as Ts=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other FIG. 3 illustrates an exemplary structure of a DL resource grid for the duration of one DL slot, which may be used in embodiments of the present disclosure.

Figure 3:
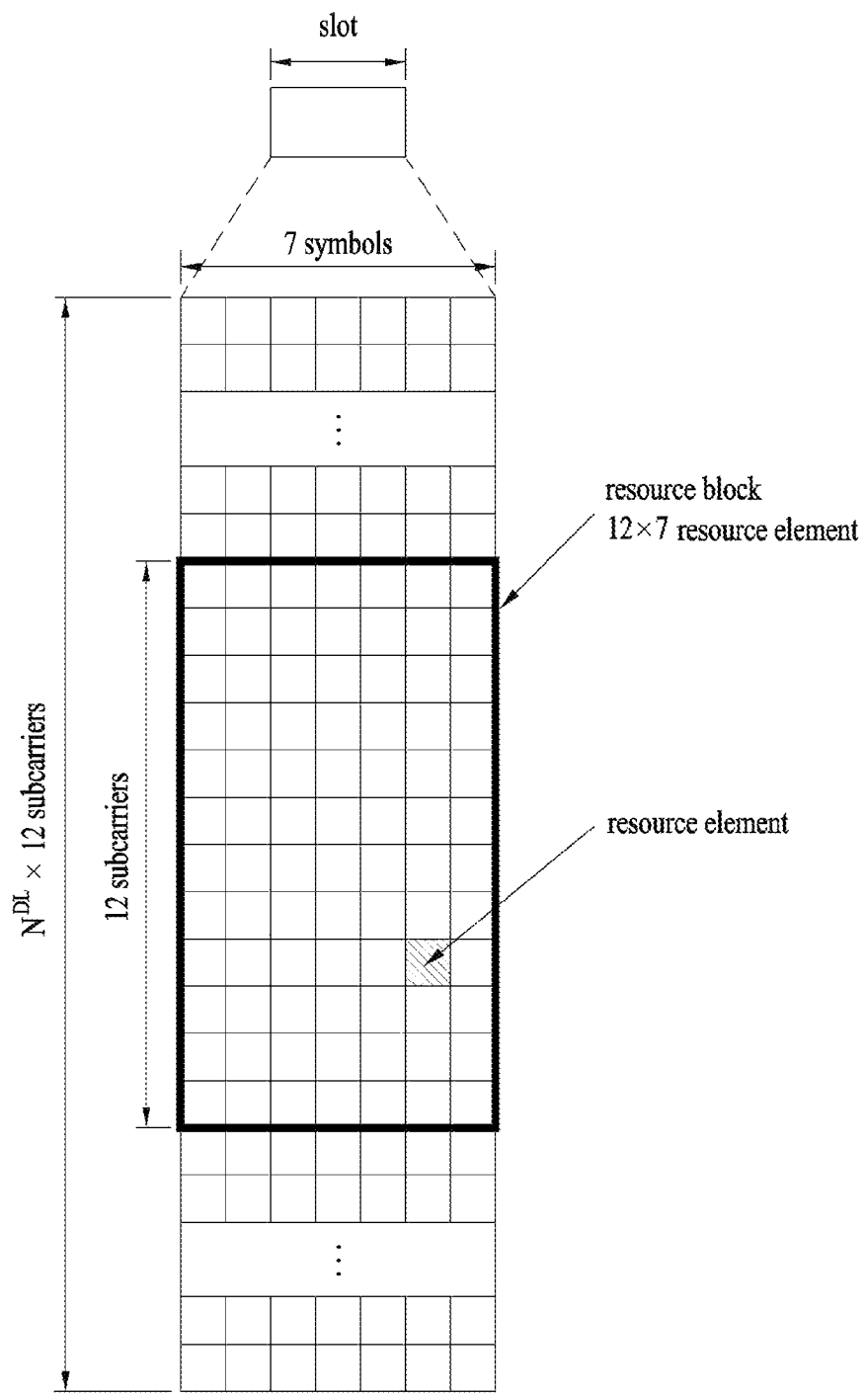
FIG. 3 is a view illustrating an exemplary resource grid for the duration of a downlink slot.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The number of RBs in a DL slot, NDL depends on a DL transmission bandwidth. A UL slot may have the same structure as a DL slot.

Figure 4:
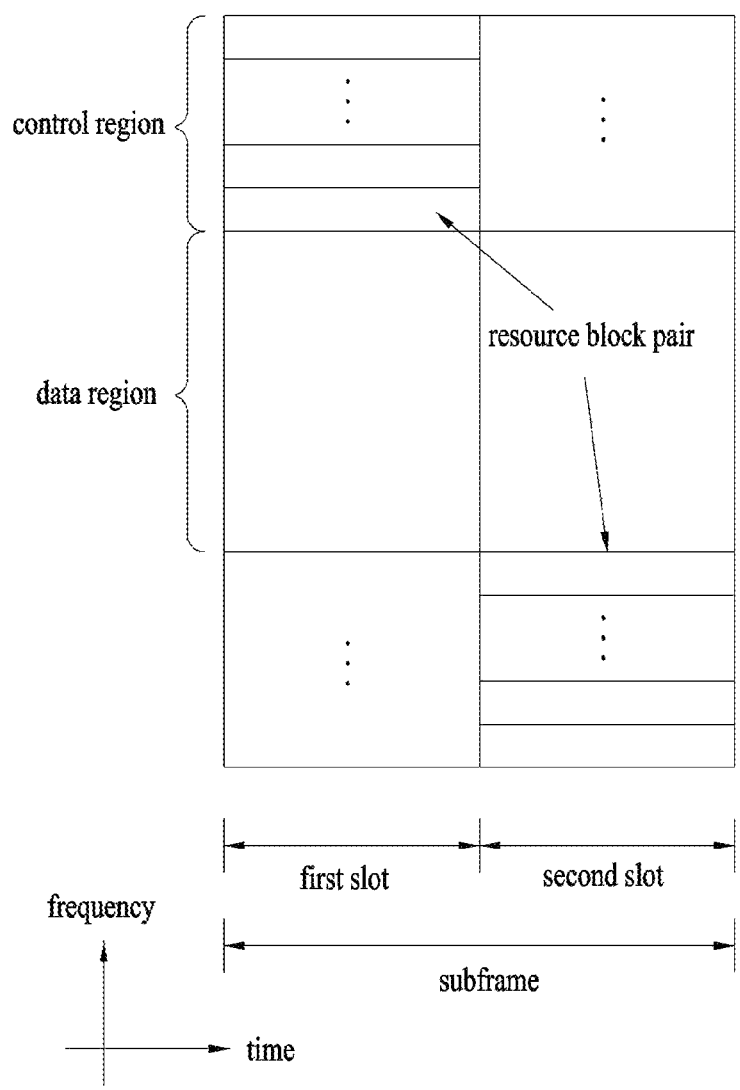
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
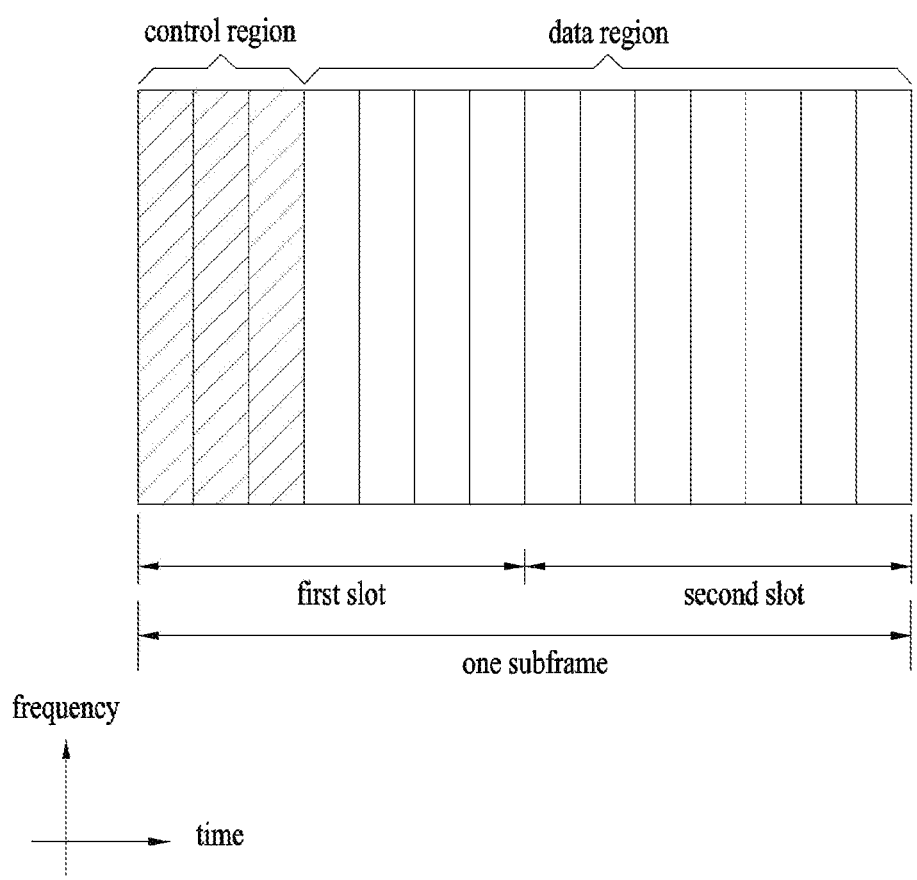
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called downlink control information (DCI). The DCI transports UL resource assignment information, DL resource assignment information, or UL transmission (Tx) power control commands for a UE group.

1.2 Physical Downlink Control Channel (PDCCH)

1.2.1 PDCCH Overview

The PDCCH may deliver information about resource allocation and a transport format for a downlink shared channel (DL-SCH) (i.e. a DL grant), information about resource allocation and a transport format for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc.

A plurality of PDCCHs may be transmitted in the control region. A UE may monitor a plurality of PDCCHs. A PDCCH is transmitted in an aggregate of one or more consecutive control channel elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}^9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. radio resource control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the signal to interference plus noise ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a paging-RNTI (P-RNTI)). If the PDCCH carries system information, particularly, a system information block (SIB), its CRC may be masked by a system information ID (e.g. a system information RNTI (SI-RNTI)). To indicate that the PDCCH carries a random access response to a random access preamble transmitted by a UE, its CRC may be masked by a random access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of search space (SS) is defined for blind decoding of a UE. An SS is a set of PDCCH candidates that a UE will monitor. The SS may have a different size for each PDCCH format. There are two types of SSs, common search space (CSS) and UE-specific/dedicated search space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

Herein, $M^{(L)}$ is the number of PDCCH candidates with CCE aggregation level L to be monitored in the SS, m=0, Λ, $M^{(L)}-1$, i is the index of a CCE in each PDCCH candidate, and i=0, Λ, L−1, $k=\lfloor n_s/2 \rfloor$ where $n_s$ the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-off keying (OOK) modulation, used for SR (Scheduling Request)

(2) Format 1a & 1b: Used for ACK/NACK transmission
 1) Format 1a: BPSK ACK/NACK for 1 codeword
 2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment

[Table 6] shows a modulation scheme according to PUCCH format and the number of bits per subframe. Table 7 shows the number of reference signals (RS) per slot according to PUCCH format. [Table 7] shows SC-FDMA symbol locations of RSs according to PUCCH formats. In [Table 6], PUCCH format 2a and PUCCH format 2b correspond to a normal cyclic prefix (CP) case.

TABLE 6

| PUCCH format | Modulation scheme | No. of bits per subframe, Mbits |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| PUCCH | SC-FDMA symbol location of RS | |
|---|---|---|
| format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
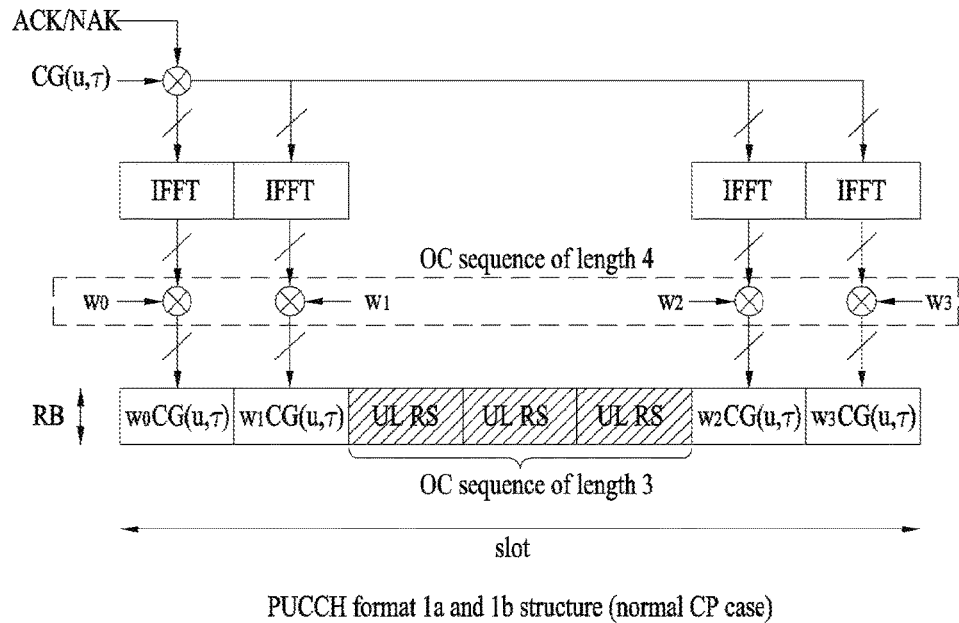
FIG. 6 is a view illustrating physical uplink control channel (PUCCH) formats 1a and 1b in a normal cyclic prefix (CP) case.
Figure 7:
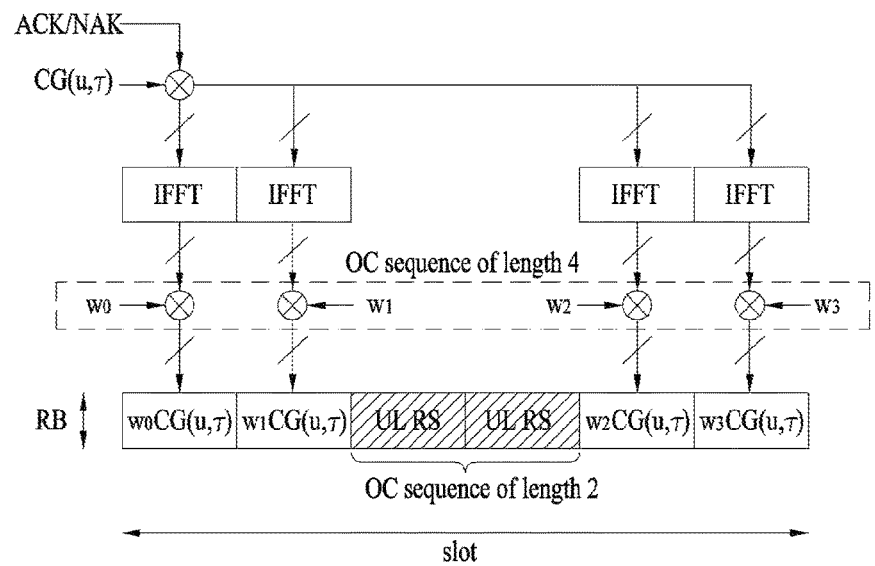
FIG. 7 is a view illustrating PUCCH formats 1a and 1b in an extended CP case.

FIG. 6 illustrates PUCCH formats 1a and 1b in a normal CP case, and FIG. 7 illustrates PUCCH formats 1a and 1b in an extended CP case.

According to the PUCCH formats 1a and 1b, control information of the same contents is repeated on a slot basis in a subframe. Each UE transmits an ACK/NACK signal in a different resource configured with a different cyclic shift (CS) (frequency domain code) and an orthogonal cover (OC) or orthogonal cover code (OCC) (time domain spreading code) of a computer-generated constant amplitude zero auto correlation (CG-CAZAC) sequence. For instance, the OC includes Walsh/DFT orthogonal code. If the number of CS and the number of OC are 6 and 3, respectively, total 18

UEs may be multiplexed within the same physical resource block (PRB) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB may be allocated to a UE through RRC (radio resource control. For non-persistent scheduling with dynamic ACK/NACK, the ACK/NACK resource may be implicitly allocated to a UE using a smallest CCE index of PDCCH corresponding to PDSCH.

Length-4 OC and length-3 OC for PUCCH format 1/1a/1b are shown in [Table 9] and [Table 10], respectively.

TABLE 9

| Sequence index $n_{oc}(n_s)$ | Orthogonal sequences $[w(0) \Lambda\ w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 10

| Sequence index $n_{oc}(n_s)$ | Orthogonal sequences $[w(0) \Lambda\ w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC)) $[\overline{w}(0) \Lambda\ \overline{w}(N_{RS}^{PUCCH}-1)]$ for a reference signal in PUCCH format 1/1a/1b is shown in [Table 11].

TABLE 11

| Sequence index $\overline{n}_{oc}(n_s)$ | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
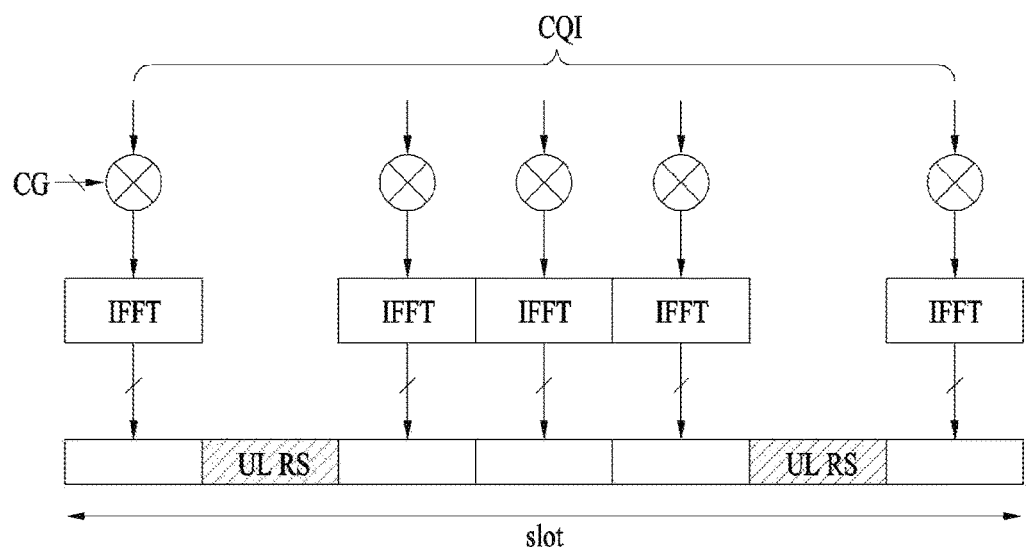
FIG. 8 is a view illustrating PUCCH format 2/2a/2b in the normal CP case.
Figure 9:
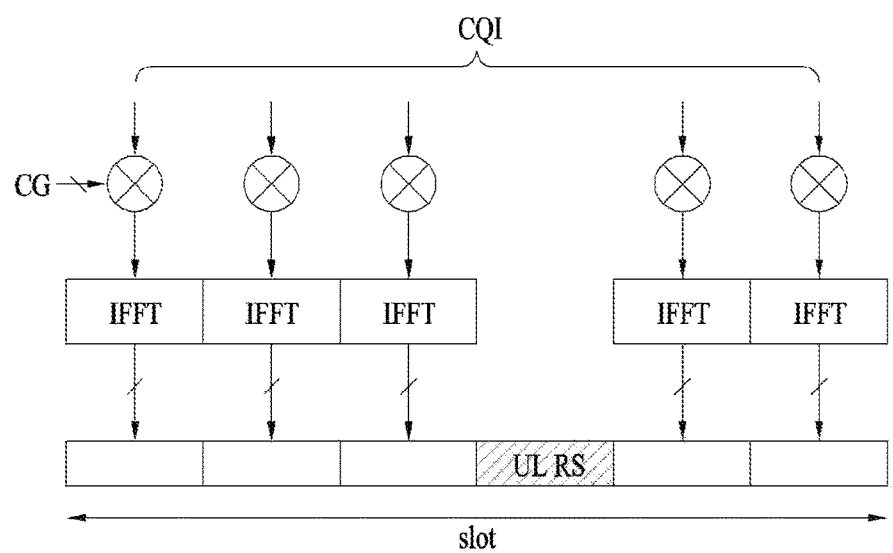
FIG. 9 is a view illustrating PUCCH format 2/2a/2b in the extended CP case.

FIG. 8 illustrates PUCCH format 2/2a/2b in a normal CP case, and FIG. 9 illustrates PUCCH format 2/2a/2b in an extended CP case.

Referring to FIG. 8 and FIG. 9, in the normal CP case, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of 'Δshift PUCCH=2'

Figure 11:
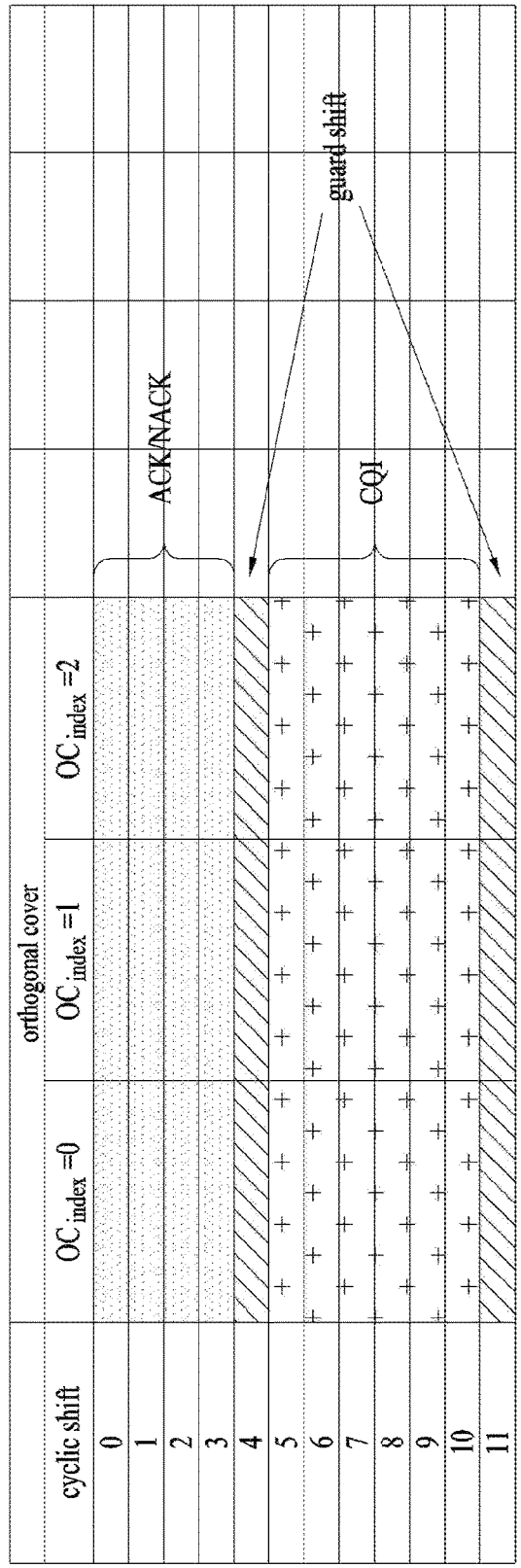
FIG. 11 is a view illustrating channelization for a hybrid structure of PUCCH format 1a/1b and PUCCH format 2/2a/2b in the same physical resource block (PRB)

FIG. 11 is a diagram of channelization for a hybrid structure of PUCCH format 1/1a/1b and PUCCH format 2/2a/2b.

CS hopping and OC remapping may be applicable in a following manner.

(1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource nr for PUCCH format 1/1a/1b may include the following combinations.

(1) CS (=equal to DFT orthogonal code at symbol level) (ncs)

(2) OC (OC at a slot level) (noc)

(3) Frequency RB (nrb)

If indexes indicating CS, OC and RB are set to ncs, noc, nrb, respectively, a representative index nr may include ncs, noc and nrb. In this case, the nr may meet the condition of 'nr=(ncs, noc, nrb)'.

The combination of CQI, PMI, RI, CQI and ACK/NACK may be delivered through the PUCCH format 2/2a/2b. And, Reed Muller (RM) channel coding may be applicable.

For instance, channel coding for UL CQI in LTE system may be described as follows. First of all, bitstreams $a_0$, $a_1$, $a_2$, $a_3$, ..., $a_{A-1}$ may be coded using (20, A) RM code. In this case, $a_0$ and $a_{A-1}$ indicates most significant bit (MSB) and least significant bit (LSB), respectively. In case of an extended cyclic prefix, maximum information bits include 11 bits except a case that CQI and ACK/NACK are simultaneously transmitted. After coding has been performed with 20 bits using the RM code, QPSK modulation may be applied. Before the BPSK modulation, coded bits may be scrambled.

[Table 12] shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 1 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 0 | 1 | 0 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 0 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 0 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by [Equation 3].

$$b_i = \sum_{n=0}^{A-1} (a_n \cdot M_{i,n}) \bmod 2 \quad \text{[Equation 3]}$$

In [Equation 3], '$i=0, 1, 2, \ldots, B-1$' is met.

In case of wideband repots, a bandwidth of UCI field for CQI/PMI can be represented as [Table 8] to [Table 10] in the following.

[Table 13] shows UCI field for broadband report (single antenna port, transmit diversity) or open loop spatial multiplexing PDSCH CQI feedback.

TABLE 13

| Field | Bandwidth |
|---|---|
| Wideband CQI | 4 |

[Table 14] shows UCI field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UCI field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
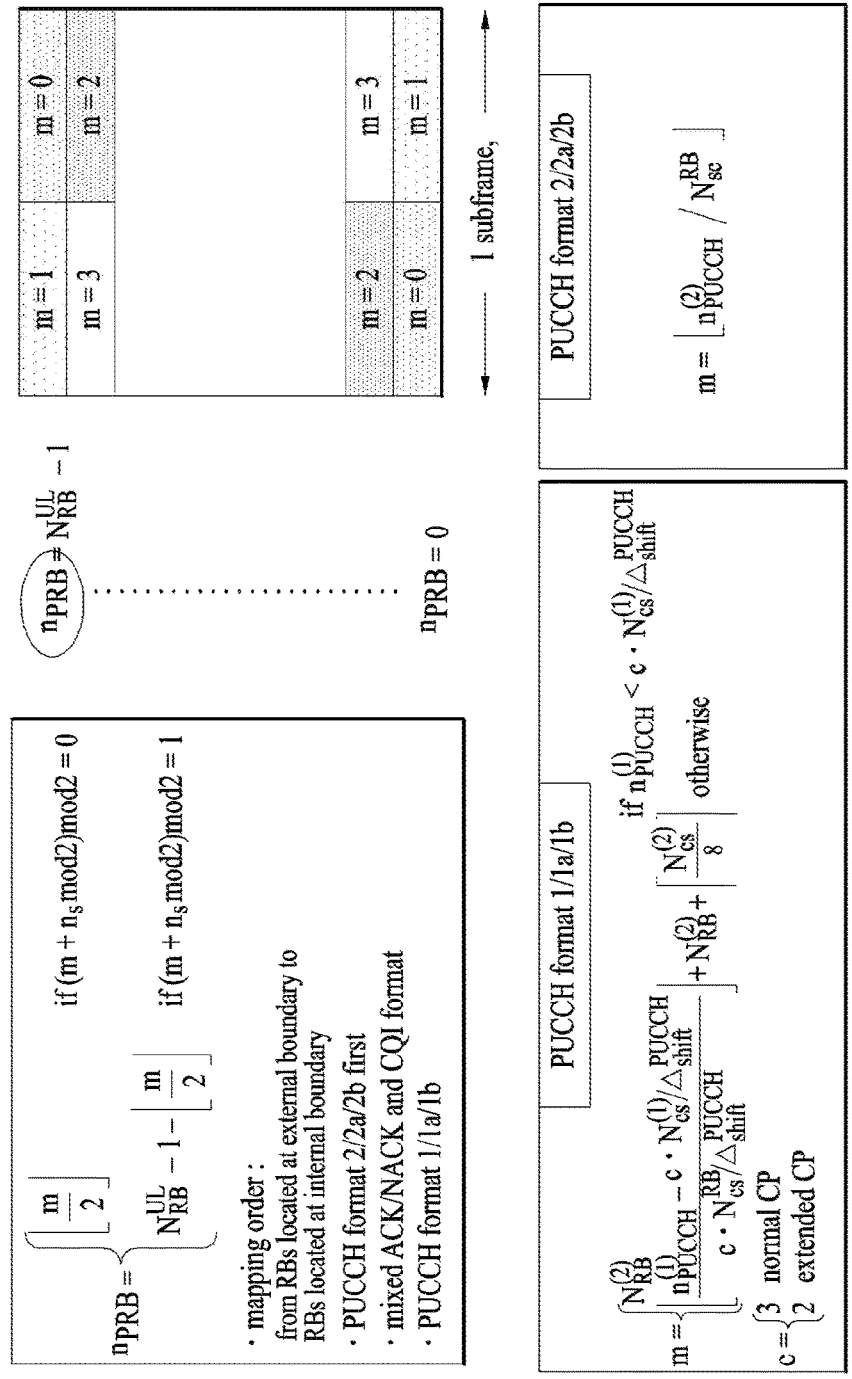
FIG. 12 is a view illustrating a PRB allocation method.

FIG. 12 is a diagram for PRB allocation. Referring to FIG. 12, PRB may be usable for PUCCH transmission in slot $n_s$.

2. Carrier Aggregation (CA) Environment 2.1 CA Overview

A 3GPP LTE system (conforming to Rel-8 or Rel-9) (hereinafter, referred to as an LTE system) uses multi-carrier modulation (MCM) in which a single component carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of radio frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a primacy cell (PCell) and a secondary cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a primary CC (PCC) and a PCell may be used in the same meaning and a secondary CC (SCC) and an SCell may be used in the same meaning in embodiments of the present disclosure.

Figure 13:
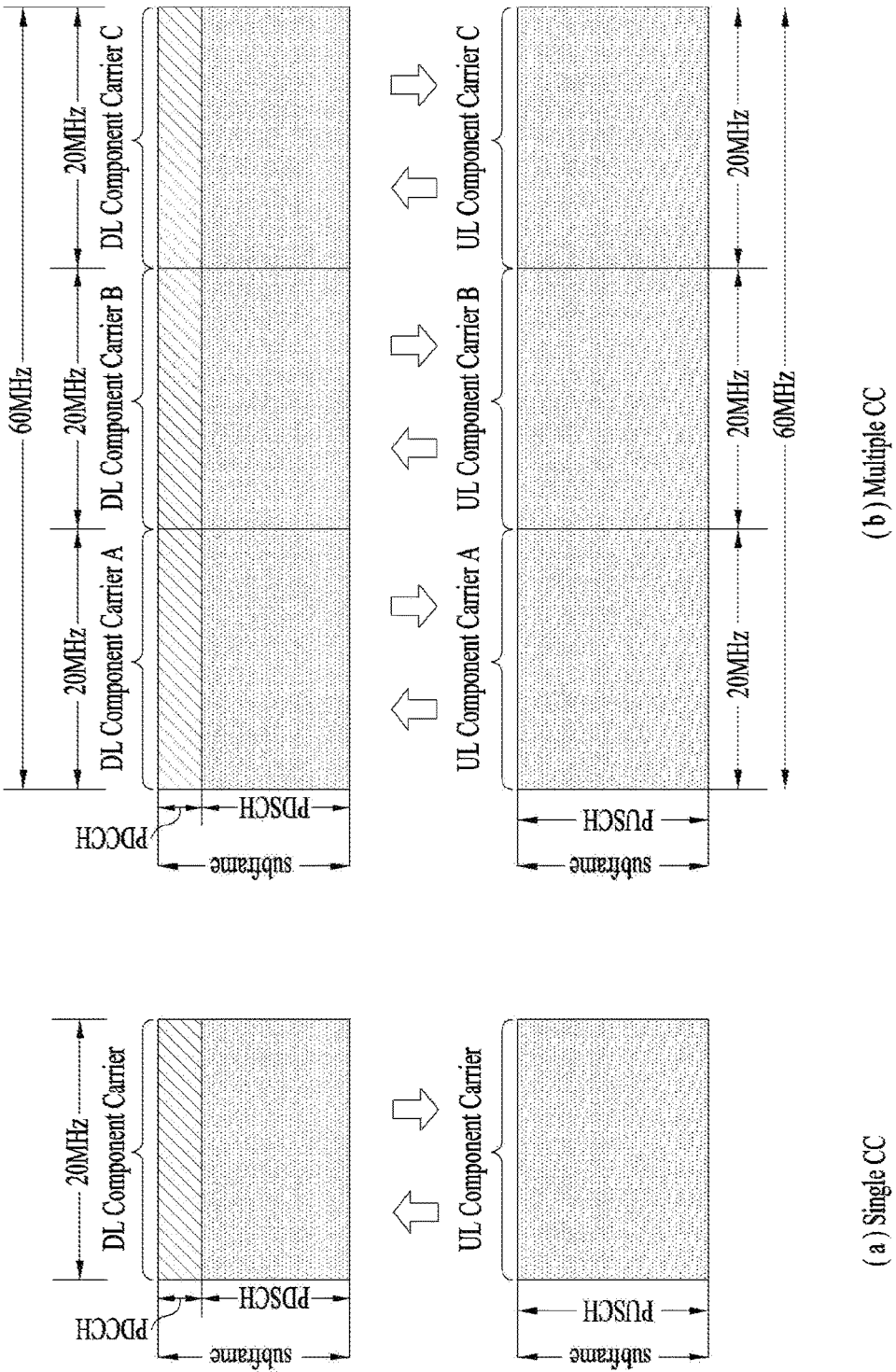
FIG. 13 is a view illustrating exemplary component carriers (CCs) and exemplary carrier aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by system information block type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a carrier indicator field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
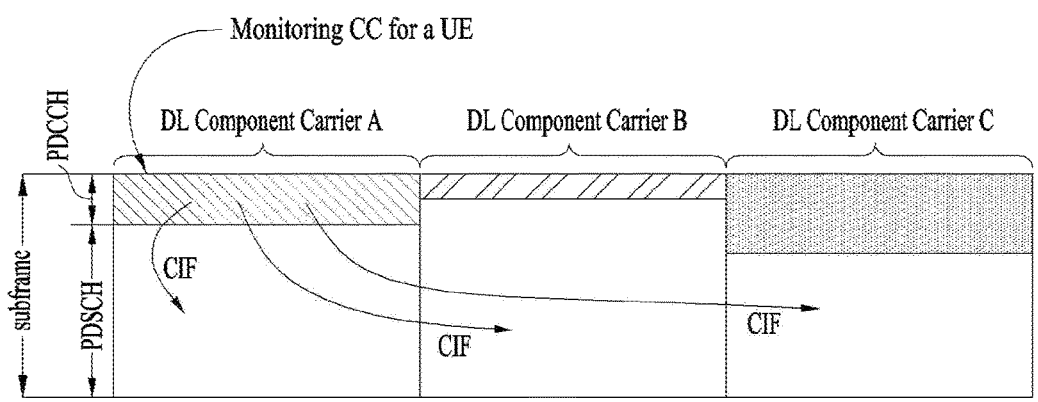
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
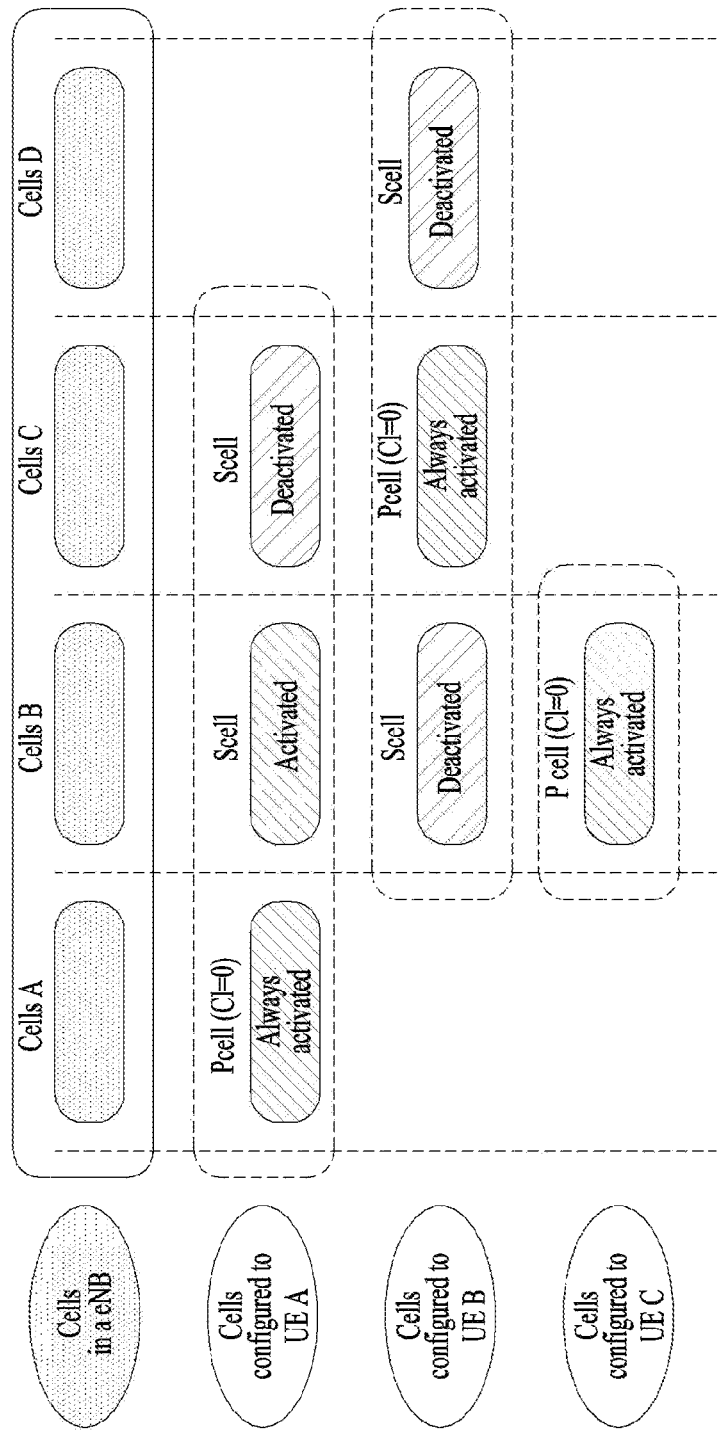
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the eNB and/or UE.

The cells shown in FIG. 15 may be configured per UE. The above-mentioned cells selected from among cells of the eNB, cell addition may be applied to CA on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and sounding reference signal (SRS) transmission. The deactivated cell is configured not to transmit/receive PDSCH/PUSCH signals by an eNB command or a timer operation, and CRS reporting and SRS transmission are interrupted.

2.3 Channel State Information (CSI) Feedback on PUCCH

First of all, in the 3GPP LTE system, when a DL reception entity (e.g., UE) is connected to a DL transmission entity (e.g., BS), the DL reception entity performs measurement on a reference signal received power (RSRP) of a reference signal transmitted in DL, a quality of a reference signal (reference signal received quality (RSRQ)) and the like at a random time and is then able to make a periodic or event-triggered report of a corresponding measurement result to the BS.

Each UE reports a DL channel information in accordance with a DL channel status via uplink. A base station is then able to determine time/frequency resources, MCS (modulation and coding scheme) and the like appropriate for a data transmission to each UE using the DL channel information received from the each UE.

Such channel state information (CSI) may include channel quality indicator (CQI), precoding matrix indicator (PMI), precoder type indication (PTI) and/or rank indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a UE.

This channel information reporting may be classified into a periodic report transmitted periodically and an aperiodic report transmitted in response to a request made by a BS.

In case of the aperiodic report, it is set for each UE by a 1-bit request bit (CQI request bit) contained in UL scheduling information downloaded to a UE by a BS. Having received this information, each UE is then able to deliver channel information to the BS via a PUSCH in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a BS via a PUCCH in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into wideband (WB) CQI and subband (SB) CQI in accordance with CQI feedback type and PMI can be classified into No PMI or Single PMI in accordance with a presence or non-presence of PMI transmission. In [Table 11], No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of OL spatial multiplexing (SM) and one WB CQI represented as 4 bits can be transmitted. If an RI is greater than 1, a CQI for a first codeword may be transmitted.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop SM and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

2.4 Method for Transmitting ACK/NACK on PUCCH 2.4.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the Tx node may identify the ACK/NACK result based on the transmission position of the PUCCH signal and the bits of the ACK/NACK signal as shown in [Table 17] below.

TABLE 17

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In [Table 17], HARQ-ACK(i) indicates the ACK/NACK result for the data unit i. For example, if a maximum of 4 data units is transmitted, i=0, 1, 2, 3. In [Table 17], DTX means that there is no data unit transmitted for corresponding HARQ-ACK(i) or the reception (Rx) node doesn't detect the existence of the data unit corresponding to HARQ-ACK (i).

In addition, $n_{PUCCH,X}^{(1)}$ indicates the PUCCH resource which should be used in actual ACK/NACK transmission, if there are 4 PUCCH resources, a maximum of four PUCCH resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0), b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(0) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In the ACK/NACK multiplexing method (see [Table 17]), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

2.4.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 16:
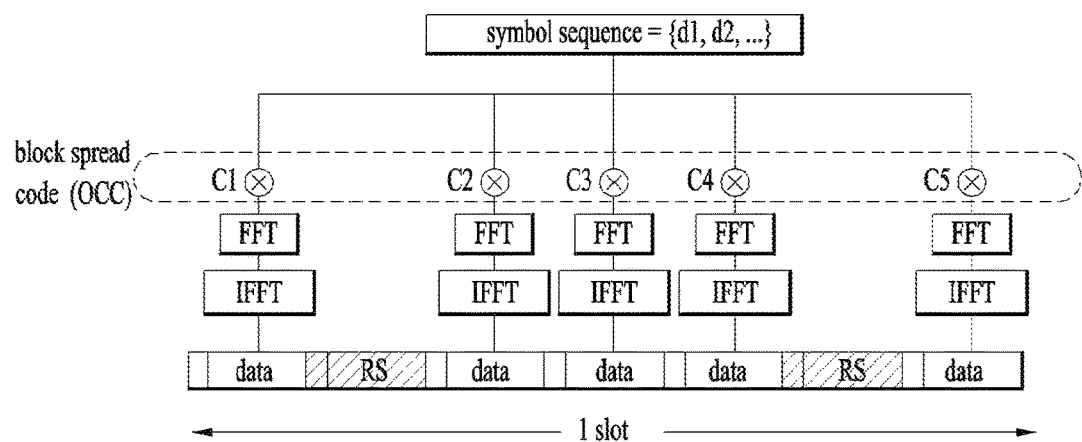
FIG. 16 is a view illustrating an exemplary new PUCCH format based on block spreading.

FIG. 16 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an OCC as shown in FIG. 16. That is, the symbol sequence is spread using the OCC to multiplex control signals of several UEs in the same RB.

In the above-described PUCCH format 2, one symbol sequence is transmitted over the time domain and UE multiplexing is performed using CS of a CAZAC sequence. However, in the new PUCCH format based on block spreading, one symbol sequence is transmitted over the frequency domain and UE multiplexing is performed using time-domain spreading based on an OCC.

For example, as shown in FIG. 16, one symbol sequence may be generated as five SC-FDMA symbols by an OCC of length-5 (that is, SF=5). Although a total of 2 RS symbols is used during one slot in FIG. 16, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present disclosure, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two codewords (CWs), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 Procedure for Transmitting and Receiving PUCCH

In a mobile communication system, one eNB transmits and receives data to and from a plurality of UEs via a wireless channel environment in one cell/sector. In a system operating using multiple carriers or the like, the eNB receives packet traffic from a wired Internet network and transmits the received packet traffic to each UE using a predetermined communication scheme. At this time, downlink scheduling is how the eNB determines when data is transmitted to which UE using which frequency domain. In addition, the eNB receives and demodulates data from the UE using a predetermined communication scheme and transmits packet traffic over a wired Internet network. Uplink scheduling is how the eNB determines when to enable which UE to transmit uplink data using which frequency domain. In general, a UE having a good channel state may transmit and receive data using more time and frequency resources.

In a system operating using multiple carriers or the like, resources may be roughly divided into a time domain and a frequency domain. The resources may be defined as resource blocks, which includes N subcarriers and M subframes or predetermined time units. At this time, N and M may be 1.

Figure 17:
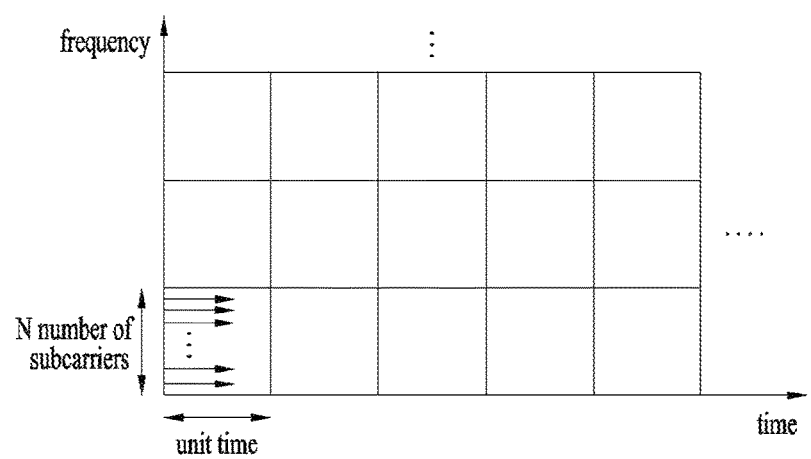
FIG. 17 is a view illustrating an exemplary configuration of a resource block (RB) with time-frequency units.

FIG. 17 is a diagram showing an example of configuring a resource block in time-frequency units.

In FIG. 17, one rectangle means one resource block and one resource block has several subcarriers on one axis and has a predetermined time unit (e.g., slots or subframes) on the other axis.

In downlink, an eNB schedules one or more resource blocks to a UE selected according to a determined scheduling rule and transmits data using resource bocks allocated to the UE. In uplink, the eNB schedules one or more resource blocks to a UE selected according to a predetermined scheduling rule and a UE transmits data in uplink using the allocated resources.

An error control method performed when a (sub)frame, in which data is transmitted and received, is lost or damaged after transmitting and receiving data after scheduling includes an automatic repeat request (ARQ) method and a hybrid ARQ (HARQ) method.

In the ARQ method, fundamentally, a transmitter waits for an acknowledgement (ACK) message after transmitting one (sub)frame and a receiver sends the ACK only upon receiving the sub(frame). When an error occurs in the (sub)frame, a negative ACK (NAK) message is sent and information on a reception frame, in which an error occurs, is removed from a receiver buffer. The transmitter transmits a subsequent (sub)frame upon receiving the ACK message but retransmits the (sub)frame upon receiving the NAK message. Unlike the ARQ method, in the HARQ method, when the received frame cannot be demodulated, the receiver transmits the NAK message to the transmitter, but the received frame is stored in a buffer during a predetermined time and is combined with a retransmitted frame, thereby increasing a reception success rate.

Recently, a HARQ method more efficient than the ARQ method is widely used. The HARQ method may be divided into various methods. For example, the HARQ method may be divided into a synchronous HARQ method and an asynchronous HARQ method according to retransmission timing and into a channel-adaptive HARQ method and a channel-non-adaptive HARQ method depending on whether the amount of resources used for retransmission is influenced by a channel state.

The synchronous HARQ method refers to a method of performing subsequent retransmission at timing determined by a system when initial transmission fails. For example, if it is assumed that retransmission is performed every four time units after initial transmission fails, retransmission timing is predetermined between the eNB and the UE and is not signaled. However, when the data transmission side receives a NAK message, the frame is retransmitted every four time units until an ACK message is received.

Meanwhile, the asynchronous HARQ method may be performed by newly scheduling retransmission timing or via additional signaling. The retransmission timing of the previously failed frame may be changed by several factors such as channel state.

The channel-non-adaptive HARQ method refers to a method of using scheduling information (e.g., the modulation method of the frame, the number of used resource blocks, adaptive modulation and coding (AMC), etc.), which is set upon initial transmission, upon retransmission. In contrast, the channel-adaptive HARQ method refers to a method of changing such scheduling information according to the channel state.

For example, in the channel-non-adaptive HARQ method, a transmission side transmits data using six resource blocks upon initial transmission and retransmits data using six resource blocks upon retransmission. In contrast, in the channel-adaptive HARQ method, initial transmission is performed using six resource blocks and retransmission is performed using greater or less than six resource blocks according to the channel state.

Although there are four HARQ methods, the asynchronous and channel-adaptive HARQ method and the synchronous and channel-non-adaptive HARQ method are mainly used. The asynchronous and channel-adaptive HARQ method may maximize retransmission efficiency by adaptively changing the retransmission timing and the amount of used resources according to the channel state but may increase overhead. Accordingly, the asynchronous and channel-adaptive HARQ method is not generally considered for uplink. In contrast, the synchronous and channel-non-adaptive HARQ method may not cause overhead because retransmission timing and resource allocation are predetermined in the system, but has very low retransmission efficiency in a considerably changed channel state.

To this end, in the current 3GPP LTE/LTE-A system, the asynchronous HARQ method is used in downlink and the synchronous HARQ method is used in uplink.

Figure 18:
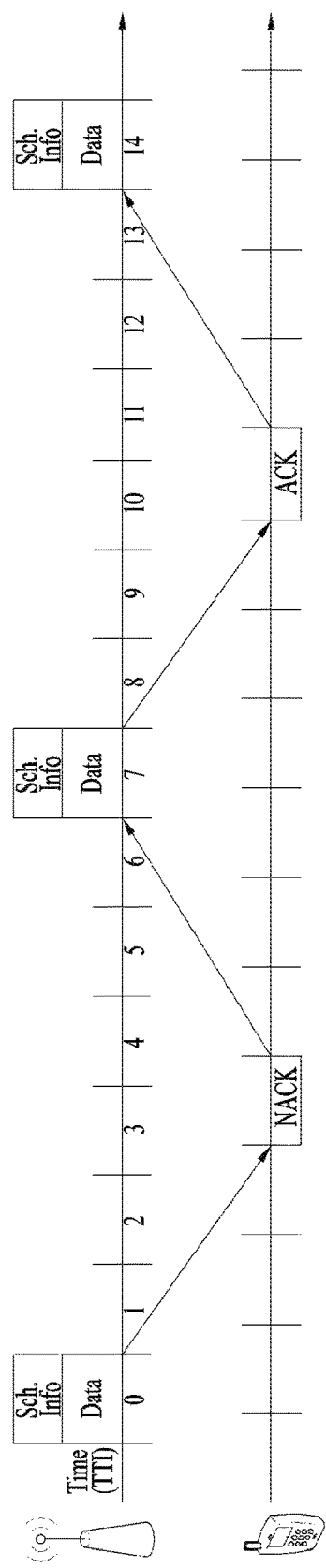
FIG. 18 is a view illustrating an exemplary method for resource allocation and retransmission in asynchronous hybrid automatic repeat request (HARQ)

FIG. 18 is a diagram showing an example of a resource allocation and retransmission method of an asynchronous HARQ method.

When an eNB transmits scheduling information in downlink, receives ACK/NAK information from a UE, and transmits next data, time delay occurs as shown in FIG. 19. This is channel propagation delay and delay occurring due to a time required for data decoding and data encoding.

A method of performing transmission using an independent HARQ process for data transmission without a gap during a delay period is being used. For example, if a shortest period from first data transmission to next data transmission is 7 subframes, data may be transmitted without a gap by setting 7 independent HARQ processes. In an LTE/LTE-A system, a maximum of eight HARQ processes may be allocated to one UE in non-MIMO.

2.6 CA Environment-Based CoMP Operation

Hereinafter, a cooperation multi-point (CoMP) transmission operation applicable to the embodiments of the present disclosure will be described.

In the LTE-A system, CoMP transmission may be implemented using a CA function in the LTE. FIG. 19 is a conceptual view illustrating a CoMP system operating based on a CA environment.

In FIG. 19, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 19 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.7 Reference Signal (RS)

Now, a description will be given of RSs which may be used in embodiments of the present disclosure.

Figure 20:
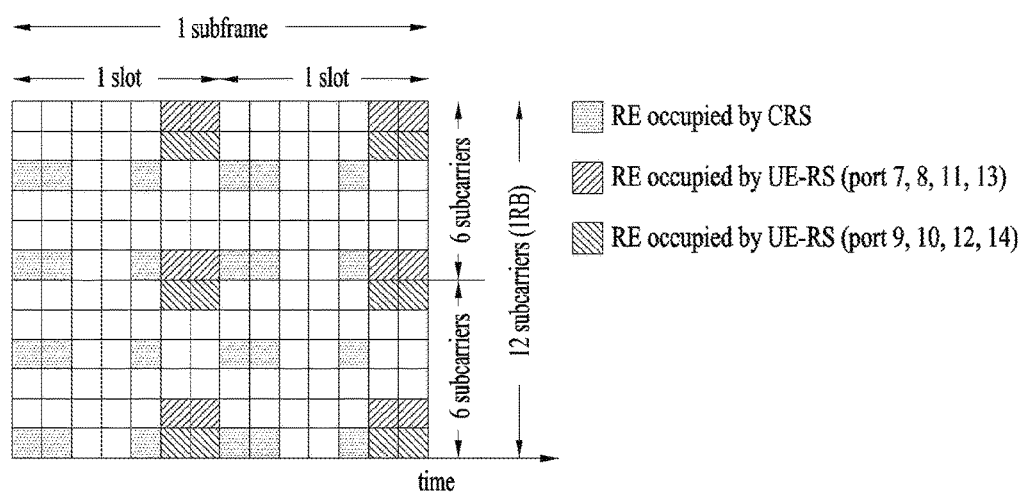
FIG. 20 is a view illustrating an exemplary subframe to which user equipment (UE)-specific reference signals (RSs) (UE-RSs) are allocated, which may be used in embodiments of the present disclosure.

FIG. 20 illustrates an example of a subframe to which UE-RSs are allocated, which may be used in embodiments of the present disclosure.

Referring to FIG. 20, the subframe illustrates REs occupied by UE-RSs among REs in one RB of a normal DL subframe having a normal CP.

UE-RSs are transmitted on antenna port(s) p=5, p=7, p=8 or p=7, 8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 19, in a PRB having frequency-domain index nPRB assigned for PDSCH transmission with respect to p=7, p=8, or p=7, 8, . . . , u+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.8 Enhanced PDCCH (EPDCCH)

In the 3GPP LTE/LTE-A system, cross-carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 21:
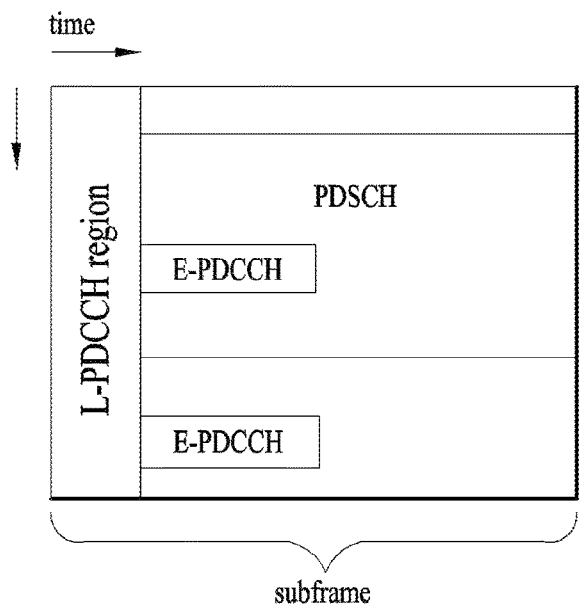
FIG. 21 is a view illustrating an exemplary multiplexing of a legacy physical downlink channel (PDCCH), a physical downlink shared channel (PDSCH), and an enhanced PDCCH (E-PDCCH) in the LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 21 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 22:
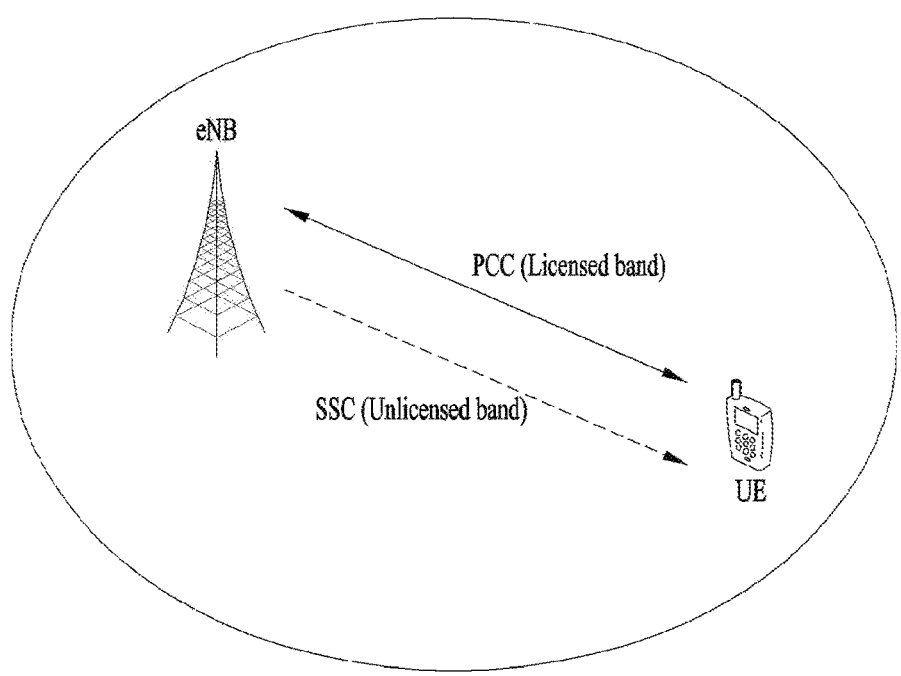
FIG. 22 is a view illustrating an exemplary CA environment supported in an LTE-Unlicensed (LTE-U) system.

FIG. 22 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 22, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 22 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 CCA Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 23:
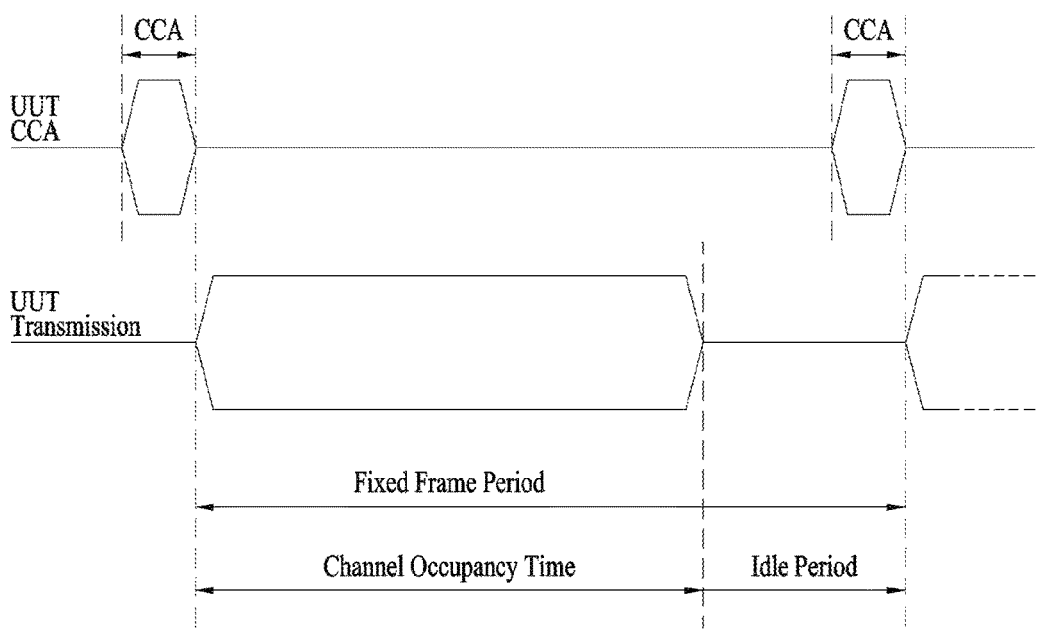
FIG. 23 is a view illustrating an exemplary frame based equipment (FBE) operation as one of listen before talk (LBT) operations.

FIG. 23 is a view illustrating an exemplary Frame Based Equipment (FBE) operation as one of LBT operations.

The European Telecommunication Standards Institute (ETSI) regulation (EN 301 893 V1.7.1) defines two LBT operations, frame based equipment (FBE) and load based equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 24:
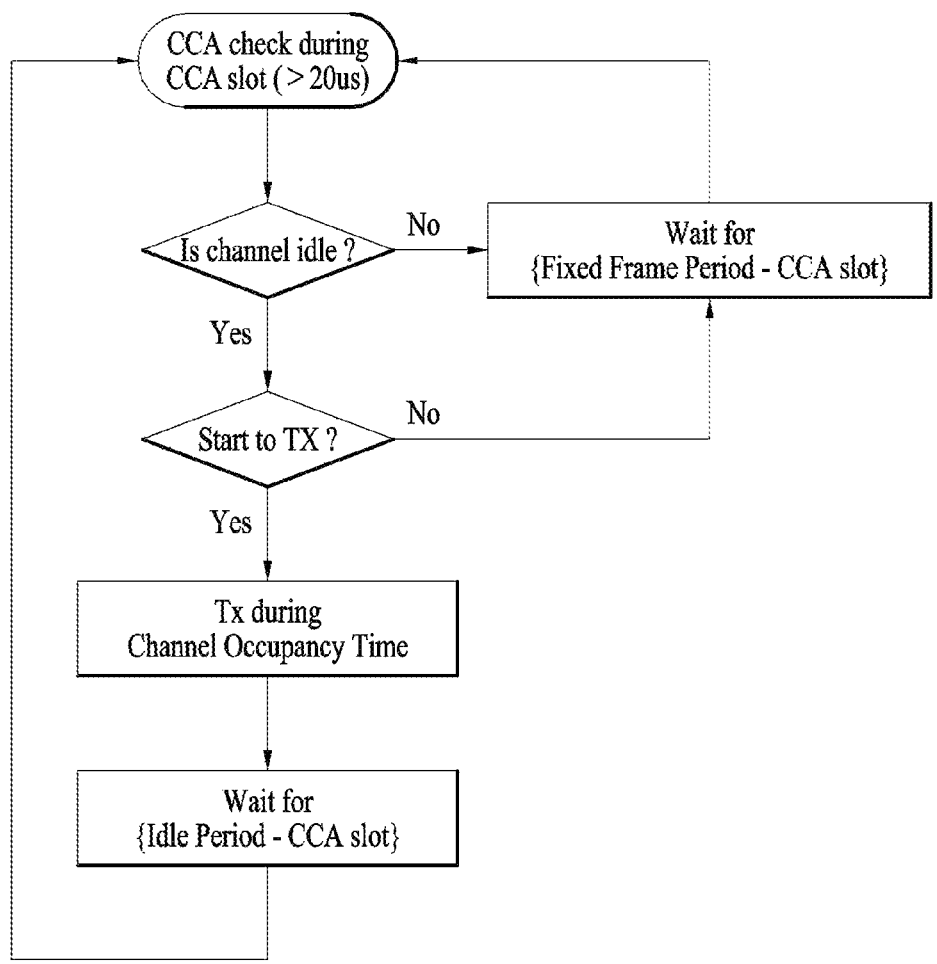
FIG. 24 is a block diagram illustrating the FBE operation.

FIG. 24 is a block diagram illustrating the FBE operation.

Referring to FIG. 24, a communication node (i.e., eNB) managing an SCell performs CCA during a CCA slot. If the channel is idle, the communication node performs data transmission. If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 25 is a view illustrating an exemplary LBE operation as one of the LBT operations.

Referring to FIG. 25(*a*), in LBE, the communication node first sets q (q∈{4, 5, . . . , 32}) and then performs CCA during one CCA slot.

FIG. 25(*b*) is a block diagram illustrating the LBE operation. The LBE operation will be described with reference to FIG. 15(*b*).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

3.3. Discontinuous Transmission (DTX) on DL

DTX in an unlicensed carrier having a limited maximum transmission period may affect some functions required for operations of the LTE system. These functions may be supported by one or more signals transmitted at the start of a discontinuous licensed assisted access (LAA) DL transmission. The functions supported by these signals include automatic gain control (AGC) setting, channel reservation, and so on.

In a signal transmission of an LAA node, channel reservation refers to transmission of signals on channels acquired for signal transmission to other nodes after channel access through a successful LBT operation.

Functions supported by one or more signals for LAA operations including DL DTX include detection of an LAA DL transmission at a UE, and time and frequency synchronization of UEs. Requirements for these functions do not mean exclusion of other available functions, and these functions may be supported by other methods.

3.3.1 Time and Frequency Synchronization

A design purpose recommended for the LAA system is to support acquisition of time and frequency synchronization at a UE by a discovery signal for radio resource management (RRM) measurement, each of RSs included in a DL transmission burst, or a combination of them. A discovery signal for RRM measurement, transmitted by a serving cell is used at least for coarse time or frequency synchronization.

3.3.2 DL Transmission Timing

In a DL LAA design, a subframe (SF) boundary may be adjusted based on a CA timing relationship between serving cells aggregated by CA defined in an LTE system (Rel-12 or below). However, this does not mean that an eNB starts a DL transmission only at an SF boundary. The LAA system may support a PDSCH transmission even though none of the OFDM symbols of one SF are available according to a result of an LBT operation. Herein, transmission of control information required for the PDSCH transmission should be supported.

3.4. RRM Measurement and Reporting

The LTE-A system may transmit a discovery signal at the start of supporting RRM functions including cell detection. The discovery signal may be referred to as a discovery reference signal (DRS). To support the RRM functions for LAA, the discovery signal, and the transmission and reception functions of the LTE-A system may be modified and then applied.

3.4.1 DRS

The DRS of the LTE-A system was designed to support a small cell on-off operation. Off-small cells refer to small cells in a state where most functions except for periodic DRS transmission are deactivated. DRSs are transmitted with a periodicity of 40, 80, or 160 ms in a DRS transmission occasion. A discovery measurement timing configuration (DMTC) is a time period during which a UE may expect to receive a DRS. A DRS transmission occasion may occur anywhere within a DMTC, and the UE may expect that the DRS will be transmitted with a corresponding periodicity in an allocated cell.

The use of the DRS of the LTE-A system in the LAA system may bring about new constraints. For example, although a DRS transmission may be allowed in some regions, like a very short control transmission without LBT, a short control transmission without LBT may not be allowed in other regions. Accordingly, a DRS transmission may be subjected to LBT in the LAA system.

If LBT is applied to a DRS transmission, the DRS may not be transmitted periodically, as is done in the LTE-A system. Therefore, the following two methods may be considered for DRS transmissions in the LAA system.

First, the DRS is transmitted only at fixed time positions within a configured DMTC under the condition of LBT.

Secondly, a DRS transmission is allowed at at least one different time position within a configured DMTC under the condition of LBT.

In another aspect of the second method, the number of time positions may be restricted to 1 within one SF. Aside from a DRS transmission within a configured DMTC, a DRS transmission outside the configured DMTC may be allowed, if it is more useful.

Figure 26:
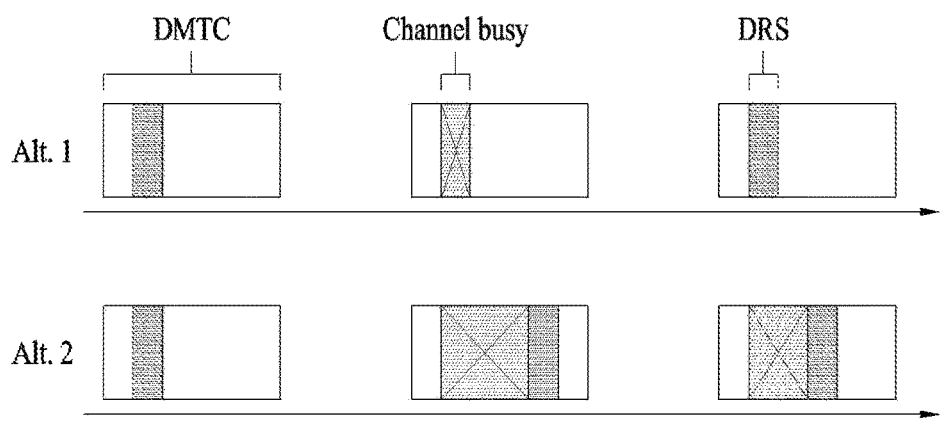
FIG. 26 is a view illustrating methods for transmitting a discovery reference signal (DRS) supported in a licensed assisted access (LAA) system.

FIG. 26 is a view illustrating DRS transmission methods supported in the LAA system.

Referring to FIG. 26, the upper part represents the above-described first DRS transmission method, and the lower part represents the second DRS transmission method. That is, a UE may receive the DRS only at a predetermined position within a DMTC period in the first DRS transmission method, whereas the UE may receive the DRS at any position within a DMTC period in the second DRS transmission method.

If a UE performs RRM measurement based on a DRS transmission in the LTE-A system, the UE may perform one RRM measurement based on a plurality of DRS occasions. If the DRS is used in the LAA system, transmission of the DRS at a specific position may not be ensured due to LBT-caused constraints. If the UE assumes the existence of the DRS in spite of non-transmission of the DRS from an eNB, the quality of an RRM measurement result reported by the UE may be degraded. Therefore, the LAA DRS should be designed such that the existence of the DRS in one DRS occasion has to be detected, which may ensure the UE to combine the successfully detected DRS occasions for the RRM measurement.

Signals including DRSs do not ensure adjacent DRS transmissions in time. That is, if no data is transmitted in SFs carrying DRSs, there may be OFDM symbols carrying no physical signal. During operation in an unlicensed band, other nodes may sense a corresponding channel as idle during this silent interval between DRS transmissions. To avert this problem, it is preferable to ensure configuration of transmission bursts including DRSs with adjacent OFDM symbols carrying a few signals.

3.5 Channel Access Procedure and Contention Window Adjustment Procedure

Hereinbelow, the afore-described channel access procedure (CAP) and contention window adjustment (CWA) will be described from the viewpoint of a transmission node.

Figure 27:
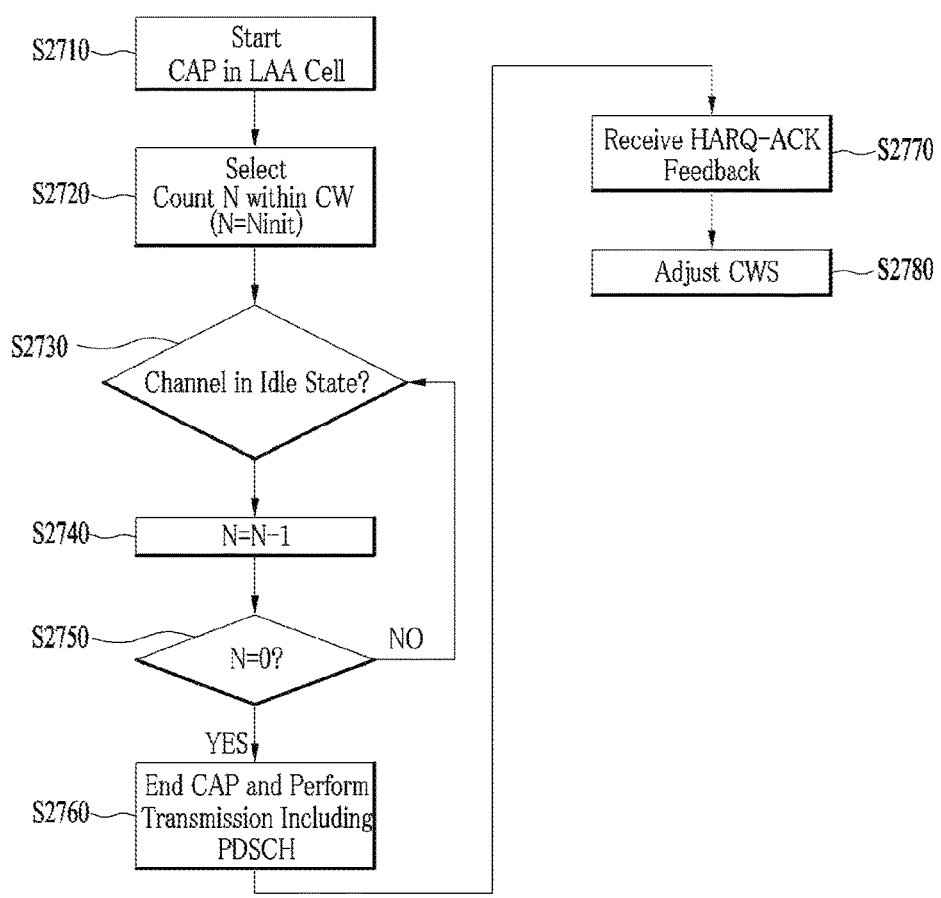
FIG. 27 is a view illustrating a channel access procedure (CAP) and contention window adjustment (CWA)

FIG. 27 is a view illustrating the CAP and CWA.

For a DL transmission, an LTE transmission node (e.g., an eNB) may initiate the CAP to operate in unlicensed cell(s), LAA SCell(s) (S2710).

The eNB may select a random backoff count N from a CW. Herein, N is set to an initial value Ninit (S2720).

The eNB determines whether a channel of LAA SCell(s) is idle, and if the channel is idle, decreases the backoff count by 1 (S2730 and S2740).

In FIG. 27, the order of steps S2730 and S2740 may be changed. For example, the eNB may first decrease the backoff count N and then determine whether the channel is idle.

If the channel is not idle, that is, the channel is busy in step S2730, the eNB may determine whether the channel is idle during a defer period (equal to or longer than 25 μsec) longer than a slot duration (e.g., 9 μsec). If the channel is idle during the defer period, the eNB may perform the CAP again. For example, if the backoff count Ninit is 10 and after the backoff count is decreased to 5, the eNB determines that the channel is busy, the eNB determines whether the channel is idle by sensing the channel during the defer period. If the channel is idle during the defer period, the eNB may perform the CAP again, starting the backoff count from 5 (or from 4 after the backoff count is decreased by 1), instead of setting the backoff count Ninit.

Referring to FIG. 27 again, the eNB may determine whether the backoff count N is 0 (S2750). If the backoff count N is 0, the eNB may end the CAP process and transmit a Tx burst including a PDSCH (S2760).

The eNB may receive HARQ-ACK information for the Tx burst from a UE (S2770).

The eNB may adjust a CWS based on the received HARQ-ACK information (S2780).

In step S2780, the eNB may adjust the CWS based on HARQ-ACK information for the first SF (i.e., the starting SF) of the latest transmitted Tx burst.

Herein, before performing CWP, the eNB may set an initial CW for each priority class. Subsequently, if the probability of determining HARQ-ACK values for a PDSCH transmitted in a reference SF to be NACK is at least 80%, the eNB increases the CW value set for each priority class to an allowed next level.

In step S2760, the PDSCH may be allocated by SCS or CCS. If the PDSCH is allocated by SCS, the eNB counts the DTX, NACK/DTX, or ANY state indicated by feedback HARQ-ACK information as NACK. If the PDSCH is allocated by CCS, the eNB counts the NACK/DTX and ANY states indicated by feedback HARQ-ACK information as NACK meanwhile the eNB does not count the DTX state indicated by feedback HARQ-ACK information as NACK.

If M (M>=2) SFs are bundled and bundled HARQ-ACK information is received, the eNB may regard the bundled HARQ-ACK information as M HARQ-ACK responses. Preferably, the bundled M SFs include a reference SF.

4. Method of Performing LBT in UL of LAA System

As more communication devices are requiring greater communication capacity, a next generation wireless communication system is trying to find ways to efficiently utilizing a limited frequency band. In particular, a cellular communication system such as LTE system considers utilizing such an unlicensed band as 2.4 GHz band mainly used by a legacy WiFi system and newly spotlighting 5 GHz band for traffic offloading.

Since an unlicensed band basically assumes that wireless transmission and reception are performed via contention between communication nodes, it is required for each communication node to perform channel sensing (CS) before a signal is transmitted to check whether or not a different communication node transmits a signal. For clarity, the above mentioned operation is referred to as LBT in the present specification. In particular, an operation of checking whether or not a different communication node transmits a signal is defined as carrier sensing (CS). If it is determined as a different communication node transmits no signal, it is defined as clear channel assessment (CCA) is checked. For contents of LBT, CS, CCA, CAP, and the like, it may refer to the aforementioned section 3.

In LTE system, an eNB and a UE should perform LBT to transmit a signal on an unlicensed band (hereinafter, LTE-U band or U-band). When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, when an STA or an AP performs CS in an unlicensed band, if a signal other than a WiFi signal is received with power equal to or greater than −62 dBm, the STA or the AP does not perform signal transmission on a corresponding channel in order not to cause any interference.

As mentioned in the foregoing description, it may be difficult to always guarantee DL transmission of an eNB or UL transmission of a UE in an unlicensed band (U-band). Hence, an LTE UE operating on the U-band may maintain access with a different cell operating on a licensed band (hereinafter, L-band) to stably control mobility, RRM function, and the like.

In embodiments of the present disclosure, a serving cell accessed by a UE on the U-band is referred to as an USCell (or U-SCell) and a serving cell accessed by the UE on the L-band is referred to as a PCell. In particular, a scheme of performing data transmission/reception on the U-band using a combination with the L-band is generally called LAA.

For UL LBT in the LTE LAA system, an eNB may signal, to a UE, the type of LBT that the UE will perform in a specific CC. The signaling may be performed by a physical layer signal (e.g., PDCCH). For example, the eNB may transmit to the UE LBT type information indicating the type of LBT to be performed in the corresponding CC by a physical layer signal/UL grant. The LBT type information may indicate whether the corresponding CC has been scheduled as a type A CC group or a type B CC group.

The LBT type information may indicate random backoff LBT (i.e., first LBT) in which it is determined whether a corresponding channel is idle until a backoff count expires, or CS LBT (i.e., second LBT) in which it is determined whether a corresponding channel is idle for a predetermined time. Further, the UL grant may further include information indicating the starting time of a UL signal transmission and an LBT parameter required for performing LBT.

For CCs of a type A CC group, random backoff LBT may be individually performed and a UL transmission may start in a carrier for which backoff has first been completed, whereas for CCs of a type B CC group, a UL transmission may start by selecting one of the CCs and performing random backoff LBT in the selected CC, while performing CS LBT in the other CCs only for a predetermined time.

In embodiments of the present disclosure, random backoff LBT may be interchangeably used with the first LBT or category 4 LBT (Cat. 4 LBT) in the same sense, and CS LBT may be interchangeably used with the second LBT in the same sense.

Compared to a licensed band, an unlicensed band has a large number of spectrum resources. Particularly, a 5-GHz band may be divided into four bands ranging from 5150 to 5350 MHz, from 5470 to 5725 MHz, from 5725 to 5850 MHz, and from 5850 to 5925 MHz, respectively. Frequency resources of 100 to 200 MHz are available in each band. If a radio frequency (RF) device is configured for each 20 MHz at a UE based on the idea that the LTE system supports a maximum bandwidth of 20 MHz, large cost is expended. Therefore, it may be economically preferred to design an RF device such that one RF device may be shared at least in each band or across a total band of 5 GHz.

If one RF device is designed for the total band of 5 GHz, CCs may not be used efficiently in spite of the existence of a plurality of 20-MHz CCs available in the corresponding band. This is because although an LBT operation should be performed before a signal transmission in a specific CC in view of the nature of a contention-based unlicensed-band operation, if a signal transmission is in progress in another CC of the 5-GHz band, the LBT operation may not be performed in the corresponding CC (because a common RF device is used), thereby making the signal transmission impossible in the CC.

In other words, because simultaneous signal transmission and reception is not allowed in CCs for which a common RF device is used, it may be efficient for a UE to align the transmission timings of CCs with each other, when the UE transmits a signal. In this context, the present disclosure proposes LBT operation methods in a UL unlicensed band under a multi-CC/CA environment.

4.1 Method for Performing Random Backoff LBT Only in Part of Allocated CCs

The UE may start UL transmissions in a part of allocated CCs which is an idle state by performing random backoff LBT in the CC(s), and in the remaining CC(s) by performing a channel sensing (CS) in the remaining CC(s) only for a predetermined time period (e.g., 16 μs+n*9 μs) shortly before the starting time of a transmission in the CC(s) subjected to random backoff LBT.

That is, the UE attempts simultaneous transmissions in the CC(s) for which random backoff LBT has been completed and the CCs determined to be an idle state as a result of the CS. Herein, if any of the CCs subjected to the random backoff LBT is available for a UL signal transmission, the UE may be configured to be capable of transmitting a UL signal in the remaining CCs if the remaining CCs are determined as an idle state after the CS only for the predetermined time period.

For example, CC#1 has been configured that CS is performed only for a predetermined time period, and CC#2 and CC#3 are configured as CCs to be subjected to random backoff LBT. If a backoff count for at least one of CC#2 or CC#3 becomes '0', the UE performs the CS in CC#1 only for the predetermined time period. If CC#1 is idle, the UE may be allowed to perform simultaneous transmissions in CC#1, and CC#2 and/or CC#3.

A UE, which has received UL grants in a group/set of carriers which have the same starting position in a specific subframe and which have been scheduled for Cat. 4 LBT, may change Cat. 4 LBT to CS LBT for sensing a channel for a predetermined time before a signal transmission, and perform CS LBT in the other carriers of the carrier group/set, upon successful completion of Cat. 4 LBT in a designated carrier of the carrier group/set. Before category 4 LBT, the UE may randomly select the designated carrier from among the carriers scheduled for category 4 LBT in the carrier group/set.

However, this operation may allow excessive channel access for CC#1. To avert the problem, carrier groups each including a plurality of CCs may be configured and the UE may be configured to perform random backoff LBT only in one carrier of each carrier group.

Now, a detailed description will be given of methods for configuring carrier groups and methods for determining a designated CC (or a first CC) to be subjected to random backoff LBT.

4.2 Methods for Configuring Carrier Groups 4.2.1 Method for Presetting Carrier Groups in System Carrier groups may be preset according to a predetermined rule. For example, the carrier groups may be configured according to a rule including at least one of the following conditions.

(1) The UE and/or the eNB may group only carriers belonging to the same timing advance group (TAG) into the same group.

One reason for that is that different UL Tx timings of carriers may make it impossible to align CCA timings. Another reason is that carriers (i.e., cells) belonging to different TAGs may experience very different channel environments.

(2) The UE and/or the eNB may group only carriers belonging to the same intra-band or only intra-band-contiguous carriers into the same group.

4.2.2 Method for Configuring Carrier Groups by Physical Layer or Higher Layer Signaling Carrier groups may be configured by physical layer signaling or higher layer signaling.

In an LTE LAA system, Rel-13 LAA, two types of LBT methods are largely defined for multi-carrier DL LBT. For example, the two LBT methods are a type A LBT in which a category 4 (Cat.4) LBT is performed independently in each CC of a carrier group (or carrier set), and a type B LBT in which Cat. 4 LBT is performed only in one representative CC of a carrier group and LBT is performed in the remaining CCs of the carrier group only for 25 μsec shortly before a transmission in the representative CC.

In an embodiment of the present disclosure, signaled carrier sets/groups may be configured in the same manner as a carrier group of CCs subjected to the type A LBT (hereinafter, referred to as a type A CC group) and a carrier group of CCs subjected to the type B LBT (hereinafter, referred to as a type B CC group), which are configured when an eNB performs DL LBT.

For example, if specific CCs are signaled as the type A CC group, the UE may perform, for the CCs, an LBT method in which "random backoff LBT is performed individually in each allocated CC" (section 4.4) or an LBT method in which "an LBT operation signaled by a UL grant is performed in each scheduled CC" (section 4.5), as described below. Further, if specific CCs are signaled as a type B CC group, the UE may perform the LBT method described in section 4.1, for the CCs.

4.2.3 Method for Considering Scheduled CCs to be One Group

On the part of a specific UE, all of CCs scheduled in the same subframe may be considered to be one carrier group.

4.3. Method for Determining CC to be Subjected to Random Backoff

If a carrier group is determined in the methods described in section 4.2, a CC to be subjected to random backoff LBT is preferably determined from among the CCs of the carrier group. Herein, a plurality of CCs to be subjected to random backoff LBT may be selected by applying the following methods.

4.3.1 Determination of CC to be Subjected to Random Backoff LBT in Predetermined Rule The UE and/or the eNB may determine a CC to be subjected to random backoff LBT according to a predetermined rule.

For example, the UE may perform random backoff LBT only in a CC having a lowest or highest SCell index among the CCs of the same carrier group in scheduled CCs.

Or, the UE may perform random backoff LBT only in a CC for which a UL transmission has actually been scheduled among the CCs of the same carrier group, and which has a lowest or highest SCell index among CCs for which scheduling grants each including Cat.4 LBT parameters (e.g., channel access priority class information, a CWS value, CWS update information, and a Cat.4 LBT type) have been signaled.

4.3.2 Determination of CC to be Subjected to Random Backoff LBT by RRC Signaling The UE may determine a CC to be subjected to random backoff LBT based on RRC signaling.

For example, LAA SCells (i.e., CCs) may be prioritized by higher layer signaling, and random backoff LBT may be performed only in a CC having a lowest or highest priority level among the CCs of the same group in scheduled CCs.

In another example, the UE may perform random backoff LBT only in a CC for which a UL transmission has actually been scheduled among the CCs of the same carrier group, and which has a lowest or highest SCell index among CCs for which scheduling grants each including Cat.4 LBT parameters (e.g., channel access priority class information, a CWS value, CWS update information, and a Cat.4 LBT type) have been signaled.

In another example, the eNB may preset only a specific CC to be subjected to random backoff LBT. Herein, a period value T_lbt for designating a specific CC may be configured, and T_lbt may be preset (e.g., 1 sec) or configured by a higher layer signal or a physical layer (L1) signal.

If the UE fails to receive new signaling indicating a specific CC after the predetermined time T_lbt, the UE may be configured to "perform random backoff LBT individually in each allocated CC" or to determine a CC for random backoff LBT in the method described in section 4.3.1 or another example of section 4.3.2.

4.3.3 Determination of CC for Random Backoff LBT by Physical Layer Signaling

The UE may determine a CC to be subjected to random backoff LBT based on physical layer signaling.

4.3.3.1 Method 1

A scheduling grant for each CC may include information indicating whether random backoff LBT is to be performed in the CC. For example, if CC#1 and CC#2 are scheduled for the UE, and a scheduling grant for CC#1 includes information indicating random backoff LBT, the UE performs random backoff LBT only in CC#1. Further, if a scheduling grant for CC#2 does not include information indicating random backoff LBT, the UE may perform CS in CC#2 only for a predetermined time period.

4.3.3.2 Method 2

Random backoff LBT may be performed only in a CC for which a scheduling grant includes random backoff LBT implementation information. For example, if CC#1 and CC#2 are scheduled for the UE, and a scheduling grant for CC#1 includes random backoff LBT implementation information (e.g., a backoff count), the UE may perform random backoff LBT only in CC#1, while performing CS in CC#2 only for a predetermined time period.

4.3.3.3 Method 3

The UE may perform random backoff LBT only in a CC having a largest signaled CWS value or a largest CWS value to be applied to actual transmission among CCs for which scheduling grants include random backoff LBT implementation information, while performing CS in the remaining CCs only for a predetermined time period.

For example, if CC#1 and CC#2 are scheduled for the UE and scheduling grants for CC#1 and CC#2 indicate CWS values, the UE may perform random backoff LBT only in CC#1 having the larger CWS value, while performing CS in CC#2 only for a predetermined time (e.g., 25 μsec) shortly before transmission in CC#1.

In another example, if CC#1 and CC#2 are scheduled for the UE and scheduling grants for CC#1 and CC#2 signal CWS update information, the UE may perform random backoff LBT only in CC#1 having the larger updated CWS value, while performing CS in CC#2 only for a predetermined time (e.g., 25 μsec) shortly before transmission in CC#1.

4.3.4 Method for Autonomously Selecting CC by UE

The UE may autonomously select a CC to be subjected to the random backoff LBT (i.e., the first LBT).

For example, the UE may randomly select a specific one of CCs in the same carrier group among a plurality of CCs scheduled for the UE.

In another example, the UE may randomly select a specific one of CCs for which UL transmissions have actually been scheduled among CCs of the same carrier group, and for which scheduling grants each including Cat.4 LBT parameters (e.g., channel access priority class information, a CWS value, CWS update information, and a Cat.4 LBT type) have been signaled, and perform random backoff LBT in the selected CC.

4.3.5 Combination of a Plurality of Methods

The UE may operate in a combination of the methods described in sections 4.3.1 to 4.3.4.

For example, in the situation described in section 4.3.3, if the UE fails to receive a scheduling grant actually indicating random backoff LBT for a CC, the UE may randomly select a specific CC and perform random backoff LBT in the selected CC, as described in section 4.3.4.

In another example, even though a CC to be subjected to random backoff LBT is preset as in section 4.3.1 or 4.3.2, if information about a CC to be subjected to random backoff LBT is transmitted by a physical layer signal according to section 4.3.3, the UE may give priority to the physical layer signal.

4.3.6 Operation Method Within Remaining Channel Occupancy Time (or UL Period of Channel Occupancy Time) of eNB In discussion of the next-generation LTE LAA system (e.g., Rel-14 eLAA), when an eNB indicates UL transmissions of other UEs during a channel occupancy time after random backoff, an LBT method (i.e., the CS LBT or second LBT) may be applied, in which CS is performed only for a predetermined time period (e.g., 25 μsec) within the channel occupancy time, and then if a channel is idle, a UL signal is transmitted.

Further, methods for indicating a remaining channel occupancy time (or a UL period in the channel occupancy time of an eNB) through a common PDCCH are under discussion. For a PUSCH scheduled in the remaining channel occupancy time (or the UL period in the channel occupancy time of the eNB), random backoff LBT (i.e., the first LBT) may be indicated as an LBT type. However, even in this case, the UE may be configured to perform the second LBT for the corresponding channel only for a predetermined time period (e.g., 25 μsec), and if the channel is idle, to transmit a PUSCH on the channel.

Even though a specific CC (e.g., a representative CC) is scheduled as the first LBT type for the UE, if the first LBT type is changed to the second LBT type, the representative CC may be excluded from a carrier group in spite of its LBT type indicated as the first LBT.

In the case where the corresponding method is introduced, if a remaining channel occupancy time (or a UL period in the channel occupancy time of an eNB) is signaled for a CC predetermined for random backoff LBT according to the afore-described methods in sections 4.3.1 to 4.3.4, the following methods may be applied.

4.3.6.1 Method 1

Even though the remaining channel occupancy time (or the UL period of the channel occupancy time of the eNB) is signaled for a representative CC, the constraint that "the LBT method in which if a channel is idle after CS only for a predetermined time period (e.g., 25 μsec), a transmission is performed on the channel" should not be applied may be imposed.

4.3.6.2 Method 2

The UE may exclude a representative CC from a carrier group, and select a new CC for random backoff LBT (i.e., the first LBT) from among the remaining carriers of the carrier group according to the afore-described methods in sections 4.3.1 to 4.3.4.

4.3.6.3 Method 3

Method 1 (section 4.3.6.1) or Method 2 (section 4.3.6.2) may be applied depending on the sequence of the reception time of signaling indicating a remaining channel occupancy time (or a UL period of the channel occupancy time of an eNB) and the starting time of multi-carrier LBT after reception of a UL grant.

For example, if the signaling indicating the remaining channel occupancy time (or the UL period of the channel occupancy time of the eNB) is first received, Method 2 may be applied. Or if the signaling indicating the remaining channel occupancy time (or the UL period of the channel occupancy time of the eNB) is received after the starting time of multi-carrier LBT following reception of the UL grant, Method 1 may be applied.

4.3.6.4 Method 4

If the UE changes the LBT type of a representative CC from the first LBT to the second LBT, transmissions may be allowed in all of the other CCs in a carrier group including the representative CC, only when the first LBT is successful. That is, the UE may perform the first LBT individually in all of the other CCs in the carrier group and perform a UL transmission in an idle CC.

4.3.7 Operation Method when CC for Random Backoff LBT is not Configured

A description will be given of LBT methods of a UE, in the case where (1) a UL transmission is not scheduled for a CC preset for random backoff LBT in the methods described in section 4.3.1 or 4.3.2, (2) random backoff LBT is not indicated for the CC preset for random backoff LBT, or (3) random backoff LBT is not configured for any CC.

4.3.7.1 Method 1

The UE may perform LBT individually in each CC based on scheduled LBT information. For example, even though CC#1 is preset as a CC to be subjected to random backoff LBT, if CS LBT performed only for a predetermined time period is indicated for CC#1 and random backoff LBT is indicated for CC#2, the UE may perform CS only for a predetermined time period before transmission in CC#1, and random backoff LBT before transmission in CC#2, based on scheduling grant information.

4.3.7.2 Method 2

The UE may select a CC to be subjected to random backoff LBT in the methods proposed in section 4.3.3 or 4.3.4.

4.3.7.3 Method 3

If random backoff LBT is not configured for any CC, the UE may perform LBT (e.g., LBT in which CS is performed only for a predetermined time period) only for a CC configured for random backoff LBT in the methods described in section 4.3, without performing LBT in the other CCs.

4.3.7.4 Method 4

The constraint that once a CC preset for random backoff LBT is scheduled in a carrier group as described in sections 4.1 and 4.2, Cat.4 LBT parameters should be included in a UL grant may be imposed.

Or the constraint that a UL grant should include Cat.4 LBT parameters, for at least one of a plurality of CCs scheduled for UL transmissions at the same time point in a carrier group in which "random backoff LBT is performed only in a part of allocated CCs" may be imposed.

Even though a representative CC subjected to random backoff LBT is configured and thus random backoff LBT is indicated by a UL grant for other CC(s) for a UL transmission at the same time point, the random backoff LBT may not be performed. In this case, LBT that performs CS only for a predetermined time period may be performed or LBT may not be performed, for the corresponding CC(s).

4.3.8 Method for Performing Random Backoff LBT in Part of CCs

Now, a description will be given of methods for performing random backoff LBT only in a specific one of allocated CCs by a UE based on the embodiments described in sections 4.1 to 4.3.

Figure 28:
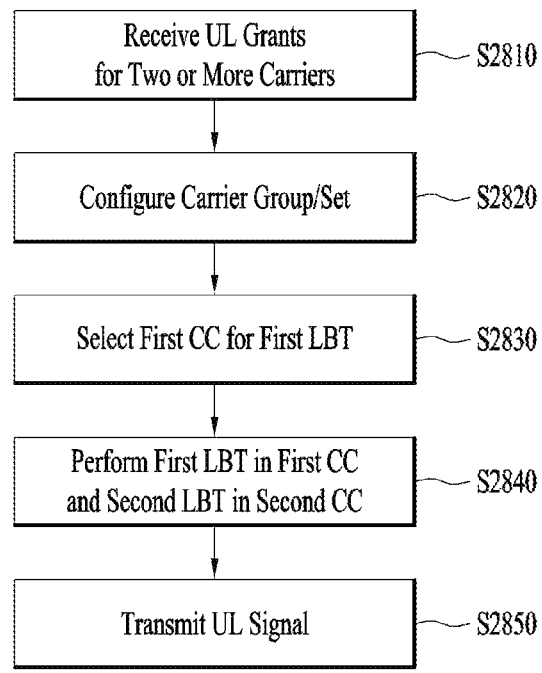
FIG. 28 is a view illustrating a method for performing random backoff LBT in a part of scheduled CCs.

FIG. 28 is a view illustrating a method for performing random backoff LBT in a part of scheduled CCs.

The UE may receive UL grants for two or more CCs in a specific subframe. Herein, the UL grants may include LBT type parameters indicating the types of LBT performed in the respective CCs, LBT parameters required for performing LBT, scheduling information, and so on (S2810).

The UE may configure carrier groups (or carrier sets) with allocated CCs. A carrier set or carrier group means configuring two or more CCs as one set or group. Herein, each of the carrier groups may include CCs in which the same LBT is performed (S2820).

In step S2820, the UE may group CCs having the same LBT type into the same carrier group after receiving the scheduling grants in step S2810, or the eNB may configure carrier groups and transmit information about the carrier groups to the UE. For a method for configuring carrier groups, refer to section 4.2.

The UE may select a first CC to be subjected to the Cat. 4 LBT (the first LBT or random backoff LBT) in a carrier group. For example, the UE may select the first CC autonomously, that is, randomly. The first CC may be referred to as a representative CC, specific CC, designated CC, or the like. The UE may select the first CC in one of the methods described in section 4.3 (S2830).

The UE may perform the first LBT in the selected first CC, while performing CS LBT (i.e., the second LBT) for sensing whether a channel is idle for a predetermined time period, in the other CCs (e.g., second CCs) of the carrier group (S2840).

If the first CC and/or a second CC is idle as a result of the first LBT and/or the second LBT, the UE may perform a UL signal transmission (S2850).

4.4 Method for Performing Random Backoff LBT Individually in Each Allocated CC In the case where a UE scheduled for a plurality of CCs in the same subframe performs random backoff LBT in each CC, considering that the UE may operate in a single RF device for a total band of 5 GHz in the LAA system, if the UE first transmits a part of the CCs, the UE may not perform CS in the other CCs. As a result, it may be impossible for the UE to perform additional transmissions in the other CCs than the CC in which a transmission has first started.

In this regard, the UE needs to align the transmission starting times of the CCs, while performing LBT individually in each CC UE. As another issue to be considered, it may be preferable that LBT operations end at similar time points between UEs in order to support FDM between the UEs, from the viewpoint of a single CC.

Figure 29:
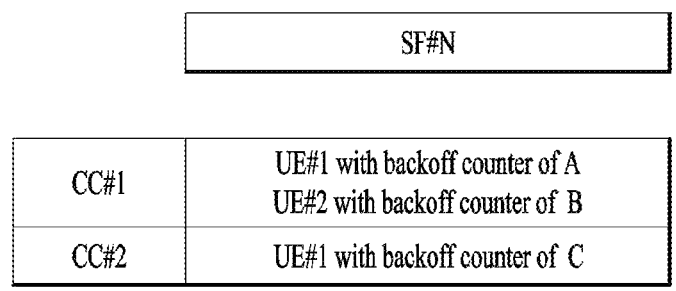
FIG. 29 is a view illustrating a method for performing individual random backoff LBT in each allocated CC.

FIG. 29 is a view illustrating a method for performing individual random backoff LBT in each allocated CC.

Referring to FIG. 29, it is assumed that CC#1 and CC#2 are scheduled at the time of SF#N for UE#1, and only CC#1 is scheduled at the time of SF#N for UE#2. In addition, it is assumed that a scheduling grant transmitted to each UE by an eNB includes a backoff count.

In this case, even though backoff counts A and C are different, UE#1 may align the transmission times of CC#1 and CC#2 with each other by a self-deferral operation or the like. The self-deferral operation is an operation of not decreasing a backoff count even though the UE does not perform CS or determines a channel to be idle.

However, if the transmission times of UE#1 and UE#2 which are multiplexed in FDM are different from the viewpoint of CC#1, a UE which completes an LBT operation later than the other UE may not perform a UL signal transmission.

That is, if UE#1 is to align the transmission times of multiple CCs with each other by self-deferral or the like, FDM between UE#1 and UE#2 may be difficult in CC#1. To solve the problem, it is necessary to align the ending times of LBT in CCE#1 between UE#1 and UE#2 and align the ending times of LBT between CCE#1 and CCE#2 on the part of UE#1. Hereinbelow, methods for aligning the transmission starting times of CCs with each other will be described.

4.4.1 Method for Matching Backoff Counts Between CCs to be Transmitted in the Same Subframe from Viewpoint of Specific UE It may be configured that backoff counts are matched between CCs scheduled in the same subframe on the part of a UE.

4.4.1.1 Method 1

If it is assumed that the eNB signals backoff counts, a specific UE may expect that backoff counts signaled for respective CCs to be transmitted in the same subframe are identical.

4.4.1.2 Method 2

If it is assumed that the eNB signals backoff counts, the signaling may be transmitted only in one CC or a part of a plurality of CCs to be transmitted in the same subframe, from the viewpoint of a specific UE. The UE may perform LBT by applying the same signaled backoff count to the scheduled CCs.

4.4.1.3 Method 3

If it is assumed that the eNB does not signal a backoff count, the UE may apply a common backoff count to LBT of CCs to be transmitted in the same subframe.

Or if the UE fails to receive scheduling grant information signaling a backoff count in section 4.4.1.2, the UE may apply a common backoff count to LBT of CCs in which UL transmissions will be performed in the same subframe.

4.4.4 Method for Aligning LBT Ending Times Between CCs in which UL Transmissions are Performed in Same Subframe from Viewpoint of Specific UE 4.4.2.1 Method 1

Figure 30:
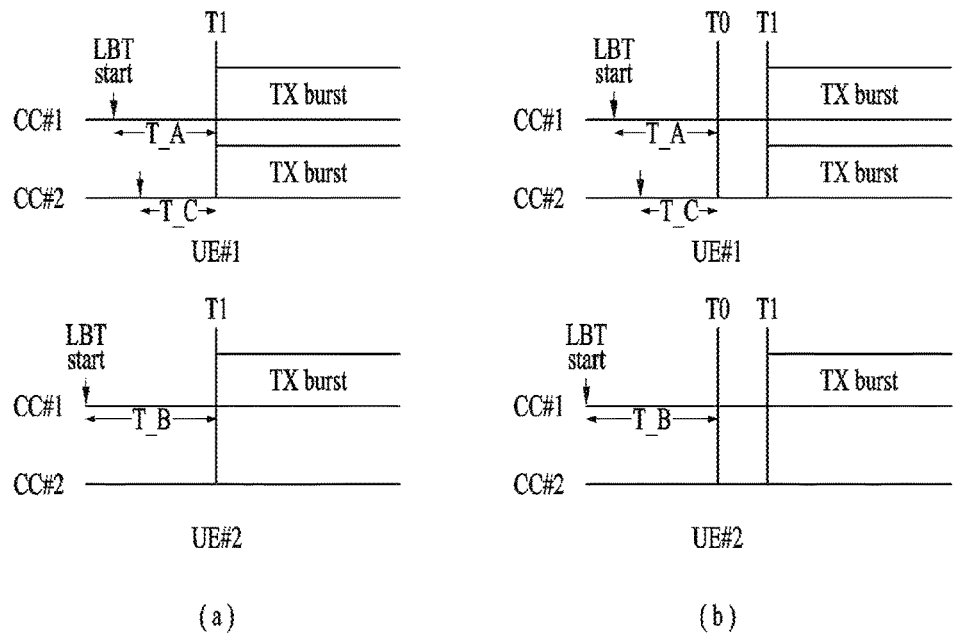
FIG. 30 is a view illustrating a method for aligning the ending times of LBT operations in CCs in which uplink transmissions are performed.

FIG. 30 is a view illustrating a method for aligning the ending times of LBT in CCs in which UL transmissions are performed.

In FIG. 30, it is assumed that CCs are scheduled for UE#1 and UE#2 in the same manner as in FIG. 28. In addition, T1 represents the ending time of LBT. Further, if a time point at which a Tx burst may start is denoted by T1 (e.g., a subframe boundary), each UE may determine an LBT operation time so that an LBT operation may end at time T1.

In FIG. 30, a time required to expire backoff count A, B or C is defined as T_A, T_B or T_C.

As illustrated in FIG. 30(*a*), UE#1 may attempt simultaneous transmissions in CC#1 and CC#2 by starting LBT in CC#1 at time T1-T_A and in CC#2 at time T_C so that LBT preferably ends simultaneously at time T1. Further, a transmission timing may be advantageously aligned with UE#2 scheduled for transmission in CC#1. This method is applicable even though a backoff count is not signaled to a UE.

4.4.2.2 Method 2

In the case where LBT is performed in the manner described in section 4.4.2.1, if a busy period occurs unexpectedly during LBT in progress, each UE may not transmit a Tx burst at time T1. Moreover, if time T1 is fixed in a situation in which neighbor cells are not synchronized accurately with each other, the unfairness problem that a neighbor cell with relatively early synchronization may first occupy a channel may occur.

To avert the problem, each UE may determine an LBT operation time so that an LBT operation may end at time T0 by setting time T0 a little ahead of time T1, as illustrated in FIG. 30(*b*). Herein, the value of T0 may be configured by physical layer signaling or higher layer signaling.

If the LBT operation ends at time T0, the UE may start a Tx burst transmission at time T1 after transmitting a reservation signal for reserving a channel during a time period spanning from T0 to T1.

Or if the LBT operation ends between time T0 and time T1, each UE start a Tx burst transmission at time T1 after transmitting a reservation signal for reserving a channel until time T1.

4.5 Method for Performing LBT Operation Indicated by UL Grant in Each Scheduled CC As in the foregoing methods, the UE may perform random backoff LBT only in a specific one CC or a part of CCs in a carrier group. Or the UE may perform random backoff LBT individually in all scheduled CCs.

In another method, the UE may perform LBT individually in each allocated CC based on received UL grant information.

For example, if CC#1, CC#2, and CC#3 are scheduled for a UE, for UL transmissions in SF#n, random backoff LBT may be indicated for CC#1 and CC#2, whereas LBT for performing CS only for a predetermined time period may be indicated for CC#3. In this case, the UE may perform LBT in each CC according to an LBT type indicated by a scheduling grant.

The eNB may configure a method to be used for the UE from among the methods described in sections 4.1 to 4.5. For example, the eNB may signal to the UE a method in which the UE is supposed to perform an LBT operation in a specific band. In another example, the UE may select an LBT operation method and indicate the selected LBT operation method to the eNB.

4.6 Constraints on Multi-CC Scheduling

In embodiments of the present disclosure, it is assumed that a UE basically operates using a single RF device in 5 GHz in the LTE LAA system. That is, simultaneous signal transmission and reception at the same time point is impossible. In this regard, the following constraints may be imposed on multi-CC scheduling.

4.6.1 Constraint 1

A gap for LBT may be configured in a specific CC. The UE may not expect UL scheduling that allocates PUSCH transmission to another carrier in the corresponding gap. Specifically, the UE may not expect scheduling that sets different starting positions for PUSCHs to be transmitted in the same subframe (SF) in different CCs.

In the Rel-14 eLAA system, four PUSCH starting positions are considered. For example, the PUSCH starting positions may be set to (1) the boundary of DFTS-OFDM symbol 0, (2) the boundary of DFTS-OFDM symbol 1, (3) the boundary of DFTS-OFDM symbol 0+25 μsec, or (4) the boundary of DFTS-OFDM symbol 0+25 μsec+TA.

In the case where CC#1 and CC#2 are simultaneously scheduled for a specific UE, for UL transmissions in SF#n, if the PUSCH starting position of CC#1 is set to the boundary of DFTS-OFDM symbol 0+25 μsec, the UE preferably performs CS for 25 μsec from the boundary of DFTS-OFDM symbol 0. If the PUSCH starting position of CC#2 is set to the boundary of DFTS-OFDM symbol 0 for the same UE, the UE should perform PUSCH transmission in CC#2, simultaneously with CS in CC#1 for 25 μsec from the boundary of DFTS-OFDM symbol 0. Since this is impossible with a single RF device, the UE may not expect such scheduling.

In embodiments of the present disclosure, if it is said that a UE does not expect a certain operation or signal, this means that the UE does not perform the operation or even though the signal is transmitted, the UE ignores the signal.

4.6.2 Constraint 2

A UE, for which the starting positions of PUSCHs to be transmitted in the same SF are scheduled to be different in different CCs, may determine whether to perform a transmission in each CC according to the priority level of the CC.

For example, a CC for which a latest UL grant is received may be set to a highest priority level, or LBT may be performed only for transmissions in CCs having the same PUSCH starting positions as the corresponding CC.

4.6.3 Constraint 3

If an SRS transmission without a PUSCH transmission in SF#n is triggered in a specific CC by a DL grant, the UE may not expect scheduling of a PUSCH in a different CC of SF#n.

Or in this case, the UE may be configured to attempt only PUSCH transmission or LBT for the PUSCH transmission in SF#n, without attempting SRS transmission or LBT for the SRS transmission in SF#n.

In another method, the UE may be configured to attempt only SRS transmission or LBT for the SRS transmission without attempting PUSCH transmission or LBT for the PUSCH transmission, in SF#n.

4.7 Methods for Performing LBT When eNB Shares Channel with UE

When an eNB occupies a channel by random backoff LBT in the Rel-13 LAA system, a maximum channel occupancy time (MCOT) may be limited according to an LBT priority class. Further, an operation of sharing a channel occupied by an eNB with a UE associated with the eNB will be introduced to the Rel-14 eLAA system. For example, if an MCOT still remains after an eNB completes a DL data transmission during the MCOT of a channel occupied by an LBT operation, a UE may be configured to use the channel occupied by the eNB during the remaining time period.

If the eNB and the UE share a channel, the UE may perform an LBT operation in which CS is performed only for a predetermined time period, instead of random backoff LBT. If the eNB performs the type B LBT (i.e., type B multi-carrier LBT) for multiple carriers, it is necessary to configure for which CC this operation is allowed.

Figure 31:
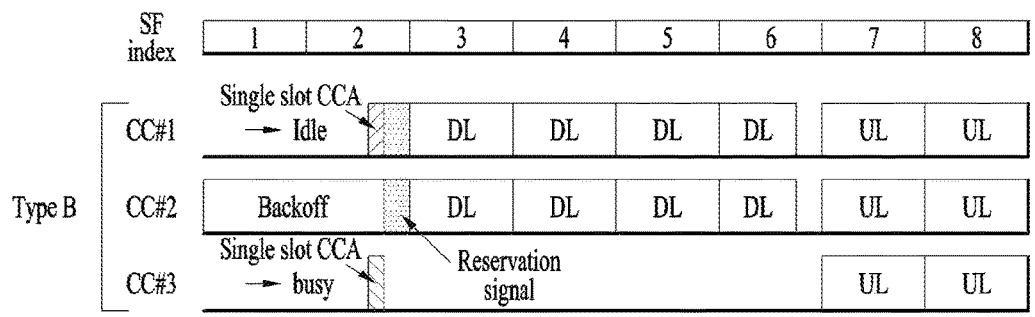
FIG. 31 is a view illustrating a method for performing LBT, when an evolved Node B (eNB) and a UE share a channel.

FIG. 31 is a view illustrating an LBT operation method in the case where an eNB shares a channel with a UE.

Referring to FIG. 31, the eNB may transmit DL data by performing type B LBT in CCE#1, CCE#2, and CCE#3. Herein, it is assumed that random backoff LBT is performed only in CC#2. If the eNB performs random backoff by using LBT parameters corresponding LBT priority class 3 and the corresponding channel (i.e., CCE#2) is idle as a result of the LBT, the eNB may occupy the channel for up to 8 msec (i.e., 8 subframes).

Herein, since CCE#1 is idle at the ending time of random backoff in CC#2, the eNB may attempt simultaneous transmissions of DL data. Because CC#3 is channel-busy, if the eNB fails to attempt simultaneous transmissions of DL data, it is preferable to determine a CC in which the eNB occupies a channel during 8 msec determined in CC#2.

In other words, it is preferable to determine a CC in which LBT for performing CS only for a predetermined time period is allowed.

Further, in FIG. 31, the eNB performs random backoff LBT in CC#2, and CS LBT in CC#1. If corresponding carriers are idle, the eNB performs DL transmissions. Herein, DL data may be transmitted in SF#3, SF#4, SF#5, and SF#6. If it is configured that the eNB and the UE are allowed to share a radio channel, the UE may perform LBT for UL data transmission after a gap of a predetermined length after DL data transmission in SF#6.

Hereinbelow, methods for performing UL LBT for a UL transmission by a UE when an eNB and the UE share a channel (or a carrier) will be described below.

4.7.1 Method 1

In the illustrated case of FIG. 31, it may be configured that CS LBT is allowed for a UE only for a predetermined time period in CC#2 for which random backoff LBT is actually performed, and random backoff LBT is performed for the other CCs.

For example, when the eNB indicates an LBT type for a UL transmission in SF#7 to the UE by a UL grant in FIG. 31, LBT for performing CS only for a predetermined time period may be indicated only for a UL transmission in CC#2.

4.7.2 Method 2

It may be configured that the UE is allowed to perform LBT for performing CS only for a predetermined time period in CC#2 in which the eNB has actually performed random backoff LBT, and CC#1 to be transmitted simultaneously, while performing random backoff LBT in the remaining CCs.

When an LBT type for a UL transmission is indicated by a UL grant in SF#7 of FIG. 31, LBT for performing CS only for a predetermined time period may be indicated for UL transmissions in CC#1 and CC#2.

More specifically, the eNB may perform the type B multi-carrier LBT and if a carrier is an idle state, the eNB may acquire an MCOT. The eNB may perform DL transmission during the MCOT, and share a remaining channel occupancy time with the UE after the DL transmission. The UE may perform a UL transmission after a gap time configured after the DL transmission of the eNB. The UE may perform CS during a predetermined time period within the gap time, and if a corresponding channel is idle, the UE may perform a UL transmission.

4.7.3 Method 3

LBT for performing CS only for a predetermined time period may be allowed in all CCs of the same carrier group irrespective of LBT results. When an LBT type for a UL transmission in SF#7 is indicated by a UL grant in FIG. 31, LBT for performing CS only for a predetermined time period may be indicated for UL transmissions in all of CC#1, CC#2, and CC#3.

5. Apparatuses

Figure 32:
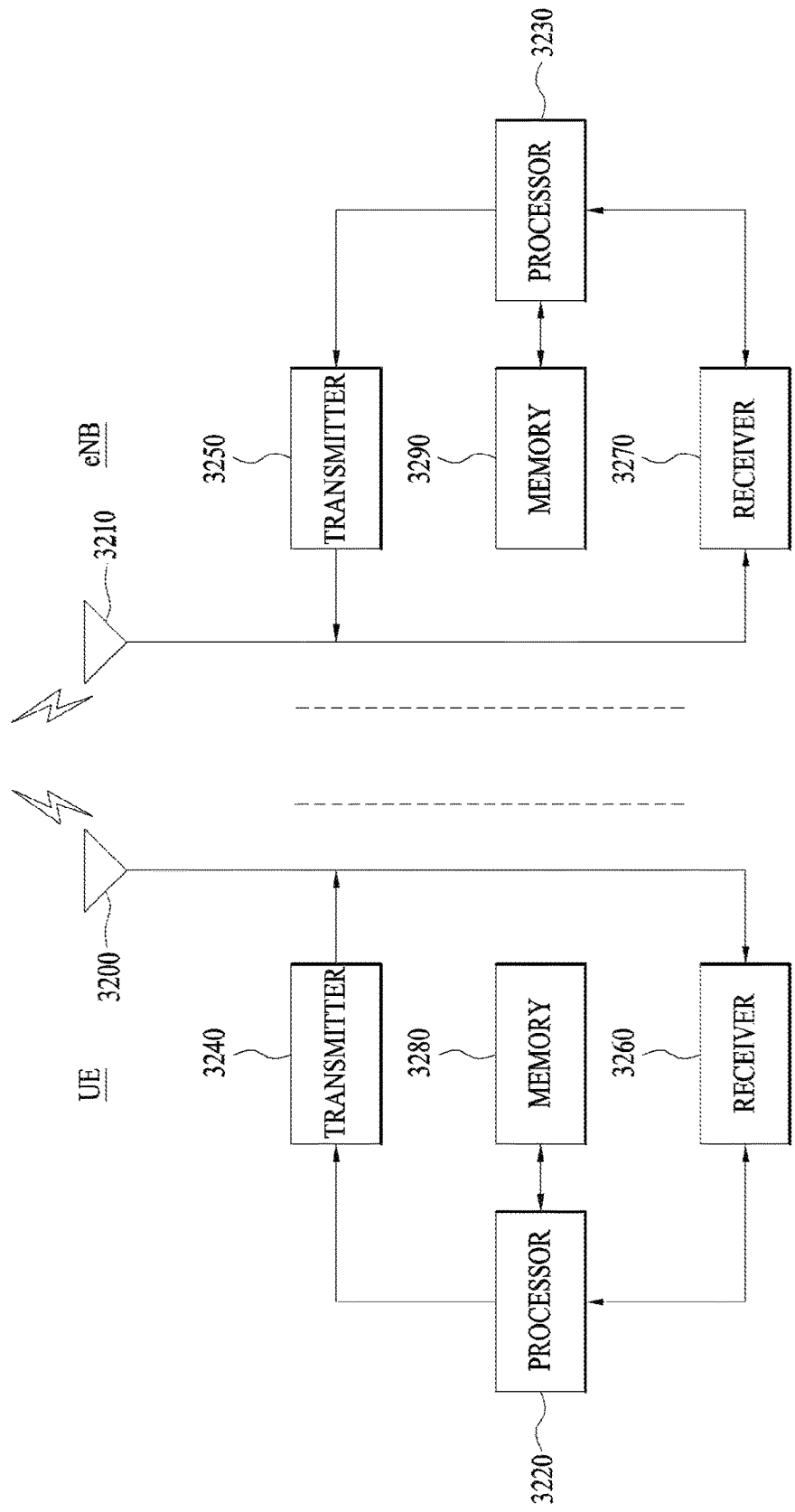
FIG. 32 is a block diagram of apparatuses for implementing the methods described with reference to FIGS. 1 to 31.

Apparatuses illustrated in FIG. 32 are means that can implement the methods described before with reference to FIGS. 1 to 31.

A UE may act as a transmission end on a UL and as a reception end on a DL. An eNB may act as a reception end on a UL and as a transmission end on a DL.

That is, each of the UE and the eNB may include a transmitter (Tx) 3240 or 3250 and a receiver (Rx) 3260 or 3270, for controlling transmission and reception of information, data, and/or messages, and an antenna 3200 or 3210 for transmitting and receiving information, data, and/or messages.

Each of the UE and the eNB may further include a processor 3220 or 3230 for implementing the afore-described embodiments of the present disclosure and a memory 3280 or 3290 for temporarily or permanently storing operations of the processor 3220 or 3230.

The embodiments of the present disclosure may be implemented, using the afore-described components and functions of a UE and an eNB. For example, the processor of the eNB and/or the UE may perform a CAP (CS, CAA, or the like) to determine whether an LAA cell is idle by controlling the transmitter and the receiver. The processor of the UE may be configured to receive UL grants for scheduling a UL channel in two or more CCs from the eNB by controlling the receiver, to randomly select a first CC to be subjected to first LBT from among the two or more CCs, and to perform the first LBT in the selected first CC and perform second LBT in the remaining CCs of the two or more CCs by controlling the receiver. Herein, the first LBT may be random backoff LBT in which random backoff is performed as long as a random backoff count, and the second LBT may be CS LBT in which a channel is sensed for a predetermined time period before a UL transmission. The UE may transmit a UL signal in a CC determined to be idle as a result of the first LBT and the second LBT. The processor of the eNB may transmit scheduling grants for scheduling two or more CCs. For details, refer to the methods described in section 1 to section 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 32 may further include a low-power radio frequency (RF)/intermediate frequency (IF) module.

Meanwhile, the UE may be any of a personal digital assistant (PDA), a cellular phone, a personal communication service (PCS) phone, a Global System for Mobile (GSM) phone, a wideband code division multiple access (WCDMA) phone, a mobile broadband system (MeNB) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3280 or 3290 and executed by the processor 3220 or 3230. The memory is located at the interior or exterior of the processor and may transmit and receive data to and from the processor via various known means.

Those skilled in the art will appreciate that the present disclosure may be carried out in other specific ways than those set forth herein without departing from the idea and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for performing an uplink channel access procedure in a wireless access system supporting an unlicensed band and multiple carriers, the method performed by a user equipment (UE) and comprising:

receiving, from a base station, an uplink grant for scheduling an uplink channel in each of two or more component carriers (CCs), wherein the uplink grant indicates a first uplink channel access procedure for each of the two or more CCs;

randomly selecting a first CC for the first uplink channel access procedure from among the two or more CCs;

performing the first uplink channel access procedure on the selected first CC; and performing a second uplink channel access procedure on each of remaining CCs of the two or more CCs, wherein the first uplink channel access procedure is a random backoff-based uplink channel access procedure based on a random backoff count, and wherein the second uplink channel access procedure is a carrier sensing-based uplink channel access procedure based on a predetermined time period before an uplink transmission.

2. The method according to of claim 1, wherein the UE transmits an uplink signal in a CC determined to be, in an idle state, by performing the first uplink channel access procedure and the second uplink channel access procedure.

3. The method of claim 1,
wherein a carrier group is configured for the two or more CCs before the first CC is selected, and
wherein the carrier group is configured dynamically by physical layer signaling.

4. The method of claim 3,
wherein the carrier group includes CCs configured for the first uplink channel access procedure.

5. The method of claim 3,
wherein the carrier group includes a CC configured for the first uplink channel access procedure and a CC configured for the second uplink channel access procedure.

6. The method of claim 1,
wherein the uplink grant includes an uplink channel access procedure type parameter, indicating a type of the uplink channel access procedure to be performed in a scheduled CC, and an uplink channel access procedure parameter, required for performing the uplink channel access procedure.

7. The method of claim 1,
wherein two or more physical uplink shared channel (PUSCH) starting positions, of the two or more CCs, are the same as each other.

8. A user equipment (UE) for performing an uplink channel access procedure in a wireless access system supporting an unlicensed band and multiple carriers, the UE comprising:
a receiver coupled to a processor; and
the processor configured to:
receive, from a base station, an uplink grant for scheduling an uplink channel in each of two or more component carriers (CCs), wherein the uplink grant indicates a first uplink channel access procedure for each of the two or more CCs,
randomly select a first CC for the first uplink channel access procedure from among the two or more CCs,
perform the first uplink channel access procedure on the selected first CC, and
preform a second uplink channel access procedure on each of remaining CCs of the two or more CCs,
wherein the first uplink channel access procedure is a random backoff-based uplink channel access procedure based on a random backoff count, and
wherein the second uplink channel access procedure is a carrier sensing-based uplink channel access procedure based on a predetermined time period before an uplink transmission.

9. The UE of claim 8,
wherein the UE transmits an uplink signal in a CC determined to be, in an idle state, by performing the first uplink channel access procedure and the second uplink channel access procedure.

10. The UE of claim 9,
wherein a carrier group is configured for the two or more CCs before the first CC is selected, and
wherein the carrier group is configured dynamically by physical layer signaling.

11. The UE of claim 10,
wherein the carrier group includes CCs configured for the first uplink channel access procedure.

12. The UE of claim 10,
wherein the carrier group includes a CC configured for the first uplink channel access procedure and a CC configured for the second uplink channel access procedure.

13. The UE of claim 8,
wherein the uplink grant includes an uplink channel access procedure type parameter, indicating a type of the uplink channel access procedure to be performed in a scheduled CC, and an uplink channel access procedure parameter, required for performing to perform the uplink channel access procedure.

14. The UE of claim 8,
wherein two or more physical uplink shared channel (PUSCH) starting positions, of the two or more CCs, are the same as each other.

* * * * *